US008995587B1

(12) United States Patent
Zhang et al.

(10) Patent No.: US 8,995,587 B1
(45) Date of Patent: *Mar. 31, 2015

(54) OPPORTUNISTIC BEAMFORMING IN A WIRELESS COMMUNICATION SYSTEM

(71) Applicant: Marvell International Ltd., Hamilton (BM)

(72) Inventors: Hongyuan Zhang, Fremont, CA (US); Sudhir Srinivasa, Sunnyvale, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,104

(22) Filed: May 13, 2013

Related U.S. Application Data

(63) Continuation of application No. 12/751,484, filed on Mar. 31, 2010, now Pat. No. 8,442,141.

(60) Provisional application No. 61/167,269, filed on Apr. 7, 2009.

(51) Int. Cl.
*H03D 1/00* (2006.01)
*H04L 27/06* (2006.01)
*H04B 7/04* (2006.01)

(52) U.S. Cl.
CPC .................................. *H04B 7/043* (2013.01)
USPC ........... 375/343; 375/267; 375/316; 375/347; 370/334; 455/101

(58) Field of Classification Search
USPC .................. 375/267, 347, 316, 343; 455/101; 370/334
See application file for complete search history.

(56) References Cited

U.S. PATENT DOCUMENTS

| 8,059,701 | B2* | 11/2011 | Tung ............................ 375/150 |
| 2006/0068820 | A1* | 3/2006 | Sugaya et al. ................ 455/512 |
| 2007/0091825 | A1* | 4/2007 | Budampati et al. ........... 370/255 |
| 2010/0054223 | A1 | 3/2010 | Zhang et al. |
| 2010/0080266 | A1 | 4/2010 | Zhang et al. |

OTHER PUBLICATIONS

U.S. Appl. No. 11/957,245, "Bit Sync for Receiver with Multiple Antennas," filed Dec. 14, 2007.
Mujtaba, "TGn Sync Proposal Technical Specification, Abstract," IEEE P802.11, Wireless LANs, May 2005.
Gilb, J., IEEE 802.15.3 TM Guide Addresses Untapped High-Rate Wireless Personal Area Network (WPAN) Market ,Aug. 14, 2009.
IEEE P802.15.3c/D00, Draft Amendment to IEEE Standard for Information Technology—Telecommunications and information exchange between systems—Local and metropolitan area networks—Specific Requirements—Part 15.3 Wireless Medium Access Control (MAC) and Physical Layer (PHY) Specifications for High Rate Wireless personal Area Networks (WPANs): Amendment 2: Millimeter-wave based Alternative Physical Layer Extension, The Institute of Electrical and Electronics Engineers, Inc., 2008.

(Continued)

*Primary Examiner* — Ted Wang

(57) ABSTRACT

A method for processing a preamble of a data unit transmitted via a communication channel includes receiving a signal via a plurality of antennas, applying a plurality of distinct steering vectors to the received signal to generate a plurality of respective outputs, and using the plurality of outputs to perform at least one of carrier sensing and symbol timing synchronization associated with the preamble.

26 Claims, 16 Drawing Sheets

(56) References Cited

OTHER PUBLICATIONS

IEEE P802.11g/D8.2, Draft Supplement to Standard [for] Information Technology—Telecommunications and information exchange between systems—Local and metropolitan area networks—Specific requirements—Part 11: Wireless LAN Medium Access Control (MAC) and Physical (PHY) specifications: Further Higher Data Rate Extension in the 2.4 GHz Band, Apr. 2003.

IEEE Std. 802.11b-1999/Cor 1-2001, IEEE Information Technology—Telecommunications and information exchange between systems—Local and metropolitan area networks—Specific requirements: Part 11: Wireless LAN Medium Access Control (MAC) and Physical Layer (PHY) specifications Amendment 2: Higher-speed Physical Layer (PHY) extension in the 2.4 GHz band—Corregendum 1,The Institute of Electrical and Electronics Engineers, Inc., Nov. 7, 2001.

IEEE Std 802.11a-1999, Supplement to IEEE Standard for Information Technology—Telecommunications and information exchange between systems—Local and metropolitan area networks—Specific requirements—Part 11: Wireless LAN Medium Access Control (MAC) and Physical (PHY) specifications: Further Higher Data Rate Extension in the 5 GHz Band, 1999.

* cited by examiner

OPPORTUNISTIC BEAMFORMING IN A WIRELESS COMMUNICATION SYSTEM

CROSS REFERENCE TO RELATED APPLICATION

This present application is a continuation of U.S. application Ser. No. 12/751,484, filed on Mar. 31, 2010, entitled "Opportunistic Beamforming In A Wireless Communication System," which claims the benefit of U.S. Provisional Patent Application No. 61/167,269, filed Apr. 7, 2009, entitled "Receiver Opportunistic Beamforming to Gain Carrier Sensing and Symbol Timing for WLAN," which are both hereby incorporated by reference herein in their entirety.

FIELD OF TECHNOLOGY

The present disclosure relates generally to communication systems in which a device receives data via a wireless communication channel and, more particularly, to using steering vectors to increase receive gain in such communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n (2009), and the IEEE draft standards 802.15.3, and 802.15.3c now in the process of being finalized, all of which are collectively incorporated herein fully by reference.

Some communication systems compliant with the IEEE 802.11b, for example, use only a single-carrier (SC) mode in which information is transmitted using only one carrier. Other transmission systems compliant with the IEEE 802.11a and 802.11g standards (or the "802.11a/g standard") as well as the IEEE 802.11n standard achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data is modulated. Thus, each frequency sub-band of the OFDM system can be viewed as an independent transmission channel within which to send data, thereby increasing the overall throughput or transmission rate of the communication system.

Generally regarding OFDM, transmitters used in the wireless communication systems that are compliant with the aforementioned IEEE 802.11a/g and 802.11n standards perform multi-carrier OFDM symbol encoding (which often includes error correction encoding and/or interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers. Likewise, receivers used in the wireless communication systems that are compliant with the aforementioned 802.11a/g and 802.11n standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation (FFT) of the received time domain analog signal. Thereafter, the baseband processor performs frequency domain equalization (FEQ) and demodulation to recover the transmitted symbols, and these symbols are then processed in a Viterbi decoder to estimate or determine the most likely identity of the transmitted symbol. The recovered and recognized stream of symbols is then decoded, which often includes deinterleaving and/or error correction using any of a number of known error correction techniques, to produce a set of recovered signals corresponding to the original signals transmitted by the transmitter.

To improve transmission performance, it is known to use multiple transmit and receive antennas within a wireless transmission system. In general, multiple transmit and receive antennas increase the number of signals which may be propagated in the communication system and/or compensate for deleterious effects associated with the various propagation paths. Such systems are commonly referred to as a multiple-input, multiple-output (MIMO) wireless transmission systems. The term also may be used to refer to degenerate forms of MIMO such as single-input, multiple-output (when only the receiver includes multiple antennas) and multiple-input, single-output (when only the transmitter has multiple antennas). These systems are specifically provided for within the 802.11n IEEE Standard. Generally speaking, the use of MIMO technology produces significant increases in spectral efficiency and link reliability of multiple antenna communication systems, and these benefits generally increase as the number of transmission and receive antennas within the MIMO system increases.

Generally, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different signal to noise ratios (SNRs) at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

Thus, in MIMO wireless communication systems, RF modulated signals generated by a transmitter may reach a particular receiver via a number of different spatial channels and, in the case of OFDM, a number of different frequency channels, the characteristics of which typically change over time due to the phenomena of multi-path and fading. To compensate for the time varying, frequency selective nature of the propagation effects on the propagation channels (spatial channels and/or frequency channels), and generally to enhance effective encoding and modulation in a wireless communication system, each receiver of the wireless communication system may periodically develop or collect channel state information (CSI) for each of the propagation channels. Generally speaking, CSI is information defining or describing one or more characteristics about each of the channels (for example, the gain, the phase and the SNR of each channel). Upon determining the CSI for one or more channels, the receiver can construct a channel model to coherently combine signal components received via respective propagation channels.

However, instead of using the various different transmission and receive antennas to form separate spatial channels on which additional information is sent, transmission and reception properties can be improved in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD).

In general, devices in systems compliant with 802.11a/g/n standards communicate using communication frames transmitted in data units that include a physical-layer (PHY) preamble followed by the communication frame, i.e., header and data portions. The PHY preamble is used for automatic gain control (AGC) setting, antenna diversity selection, timing acquisition, coarse frequency recovery, data unit and frame synchronization, and channel estimation. When receiving a data unit, a receiver typically derives channel information using the preamble, and accordingly applies coherent combining techniques only to the header and payload portions of the data unit. As a result, the receiver processes the beginning (i.e., the earlier-in-time portion) of the preamble with lower sensitivity and reliability.

SUMMARY

In an embodiment, a method for processing a preamble of a data unit transmitted via a communication channel includes receiving a signal via a plurality of antennas, applying a plurality of distinct steering vectors to the received signal to generate a plurality of respective outputs, and using the plurality of outputs to perform at least one of carrier sensing and symbol timing synchronization associated with the preamble.

In various implementations, one or more of the following features may be included. The plurality of distinct steering vectors defines an orthogonal set. The plurality of distinct steering vectors are selected from rows of a Hadamard matrix or a Discrete Fourier Transform (DFT) matrix. The received signal is an Orthogonal Frequency Division Multiplexing (OFDM) signal, where using the plurality of outputs includes generating a respective autocorrelation output for each of the plurality of outputs to define a plurality of autocorrelation outputs, selecting one of the plurality of autocorrelation outputs, and performing carrier sensing and symbol timing synchronization based on the selected one of the plurality of autocorrelation outputs. The received signal is an OFDM signal, and where using the plurality of outputs includes generating a respective autocorrelation output for each of the plurality of outputs to define a plurality of autocorrelation outputs, generating a respective carrier sensing output for each of the plurality of autocorrelation outputs to define a plurality of carrier sensing outputs, selecting one of the plurality of autocorrelation outputs based on the plurality of carrier sensing outputs, and determining symbol timing using the selected one of the plurality of autocorrelation outputs. The received signal is an OFDM signal, and where the method includes generating a frequency-domain representation of the received signal, where the frequency-domain representation of the received signal is associated with a first non-empty set of tones and a second non-empty set of tones; where applying the plurality of distinct steering vectors to the received signal includes applying the plurality of distinct steering vectors to the frequency-domain representation of the received signal for each tone in the first set of tones so that each of the plurality of outputs corresponds to a respective set of tone outputs, and generating an energy metric associated with the plurality of outputs; where using the plurality of outputs includes performing carrier sensing using the energy metric. Generating the energy metric associated with the plurality of outputs includes selecting, from the plurality of outputs, an output associated with a maximum magnitude for each tone in the first set of tones to generate a set of selected tone outputs, and calculating the energy metric of the set of selected tone outputs in view of the second non-empty set of tones. Generating the energy metric associated with the plurality of outputs includes determining, for each of the plurality of outputs, a respective energy level for each tone in the first set of tones to define a plurality of sets of energy levels, calculating a sum of energy levels for each of the plurality of sets of energy levels to define a plurality of energy level sums, and associating the energy metric with a largest one of the plurality of energy level sums. The signal includes a plurality of signal components each associated with a respective one of the plurality of antennas, where generating the frequency-domain representation of the received signal includes calculating a Fast Fourier Transform (FFT) on each of the plurality of signal components. The received signal is an OFDM signal, and where using the plurality of outputs includes generating a frequency-domain representation of each of the plurality of outputs to define a plurality of frequency-domain outputs, where the plurality of frequency-domain outputs is associated with a first non-empty set of tones and a second non-empty set of tones, selecting, from the plurality of frequency-domain outputs, a frequency-domain output associated with a maximum magnitude for each tone in the first set of tones to generate a set of selected tone outputs, generating an energy metric based on the set of selected tone outputs, and performing carrier sensing using the energy metric. The received signal is a single-carrier (SC) signal, and where using the plurality of outputs includes generating a respective cross-correlation output for each of the plurality of outputs to define a plurality of cross-correlation outputs, generating a respective metric for each of the plurality of cross-correlation outputs to define a plurality of metrics, and selecting one of the plurality of metrics to perform carrier sensing. Using the plurality of outputs includes selecting one of the plurality of cross-correlation outputs in accordance with the selected one of the plurality of metrics to perform symbol timing synchronization. The received signal is a single-carrier (SC) signal, where using the plurality of outputs includes generating a respective cross-correlation output for each of the plurality of outputs to define a plurality of cross-correlation outputs, generating a respective carrier sensing metric for each of the plurality of cross-correlation outputs to define a plurality of carrier sensing metrics, selecting one of the plurality of carrier sensing metrics to define a carrier sensing output, and selecting one of the plurality of cross-correlation outputs in accordance with the selected one of the plurality of carrier sensing metrics to perform symbol timing synchronization.

In another embodiment, a method for processing a preamble of a data unit transmitted via a communication channel includes receiving a signal via a plurality of antennas, applying a steering vector to the received signal to generate an output, where the applied steering vector is selected based on a previously processed data unit, and using the output to perform at least one of carrier sensing and symbol timing estimation associated with the preamble, where the communication channel is at a frequency band below 8 GHz.

In various implementations, one or more of the following features may be included. The method includes applying the steering vector to a previously received signal associated with the previously processed data unit, determining that the previously processed data unit is properly received, and selecting the steering vector for application to the received signal in response to determining that the previously processed data unit is properly received. The steering vector is a second steering vector, and the method includes applying a first steering vector to a previously received signal associated with the previously processed data unit, where the first steering vector is distinct from the second steering vector, determining that the previously processed data unit is not properly received, and selecting the second steering vector for application to the received signal in response to determining that the previously processed data unit is not properly received. The method includes selecting the steering vector from a set of orthogonal vectors. The method includes selecting the steering vector based on an information associated with a Media Access Channel (MAC) layer. Selecting the applied steering vector includes receiving a time-out event associated with the MAC layer, and selecting the steering vector distinct from a vector used to receive the previously processed data unit in response to the time-out event. The method includes receiving from a MAC layer an indication of when a new steering vector is to be applied, and selecting the steering vector in response to receiving the indication, wherein the steering vector is distinct from a previous steering vector used to receive a previously received signal associated with the previously processed data unit.

In another embodiment, an apparatus for use in a wireless communication system includes a signal path to receive a data unit received via a plurality of antennas, where the data unit includes a physical layer (PHY) preamble, and an opportunistic receive beamforming (opp-RxBF) processor including a plurality of vector multipliers to apply a plurality of steering vectors to the preamble to generate a plurality of respective outputs and a carrier sensing module to perform carrier sensing based on the plurality of outputs.

In various implementations, one or more of the following features may be included. The opp-RxBF processor applies the plurality of steering vectors to the received signal in parallel. The apparatus includes a codebook to store the plurality of steering vectors, where the plurality of steering vectors define an orthogonal set. The apparatus includes a symbol timing synchronization unit to identify a start of an OFDM symbol in the data unit using the plurality of outputs. The preamble defines a first portion of the data unit, and the data unit includes a second portion; the apparatus includes a preamble processor to generate channel information descriptive of a communication channel via which the data unit is received, and a coherent signal combining processor to coherently combine a plurality of signal components associated with the plurality of antennas using the channel information when the second portion of the data unit is received. The apparatus includes a plurality of autocorrelation calculators each coupled to a respective one of the plurality of vector multipliers to generate a plurality of autocorrelation outputs based on the plurality of outputs, and a selection unit to select one of the plurality of autocorrelation outputs according to a criterion, where the carrier sensing unit performs carrier sensing using the selected one of the plurality of autocorrelation outputs. The apparatus further includes a plurality of autocorrelation calculators each coupled to a respective one of the plurality of vector multipliers to generate a plurality of autocorrelation outputs based on the plurality of outputs, where the carrier sensing module includes a plurality of carrier sensing units each coupled to a respective one of the plurality of autocorrelation calculators to generate a plurality of carrier sensing metrics based on the plurality of autocorrelation outputs, and a selection unit to select one of the plurality of carrier sensing metrics according to a criterion. The apparatus includes a multiplexer coupled to the plurality of autocorrelation calculators and to the selection unit to select one of the plurality of autocorrelation outputs in accordance with the selected one of the plurality of carrier sensing metrics, and a symbol timing synchronization unit to identify a start of an OFDM symbol in the data unit based on the selected one of the plurality of autocorrelation outputs. The apparatus includes a frequency-domain conversion unit to generate a frequency-domain representation of the preamble, and an energy computation unit to generate an energy metric associated with the plurality of outputs, where the carrier sensing module performs carrier sensing based on the energy metric. The apparatus includes a plurality of FFT units each coupled to a respective one of the plurality of vector multipliers to generate a plurality of frequency-domain outputs based on the plurality of outputs, and a plurality of energy computation units each coupled to a respective one of the plurality of FFT units to generate a plurality of energy metrics based on the plurality of frequency-domain outputs, where the carrier sensing module performs carrier sensing based on the plurality of energy metrics. The apparatus includes a plurality of cross correlation calculators each coupled to a respective one of the plurality of vector multipliers to generate a plurality of cross correlation outputs based on the plurality of outputs, a plurality of metric generators each coupled to a respective one of the plurality of cross correlation calculators to generate a plurality of metrics based on the plurality of cross correlation outputs, and a selection unit to select one of the plurality of metrics according to a criterion, where the carrier sensing module performs carrier sensing based on the selected one of the plurality of metrics. The apparatus includes a plurality of cross correlation calculators each coupled to a respective one of the plurality of vector multipliers to generate a plurality of cross correlation outputs based on the plurality of outputs, a plurality of metric generators each coupled to a respective one of the plurality of cross correlation calculators to generate a plurality of metrics based on the plurality of cross correlation outputs, where the carrier sensing module includes a plurality of carrier sensing units each coupled to a respective one of the plurality of metric generators to generate a plurality of carrier sensing outputs based on the plurality of metrics, and a selection unit to select one of the plurality of carrier sensing outputs.

In another embodiment, an apparatus for use in a wireless communication system includes a signal path to receive a data unit received via a plurality of antennas, wherein the data unit includes a physical layer (PHY) preamble, an opportunistic receive beamforming (opp-RxBF) processor including a vector multiplier to apply a steering vector to the preamble to generate an outputs, wherein the steering vector is selected based on a previously processed data unit, and a carrier sensing module to perform carrier sensing based on the output, where the data unit is received via a communication channel at a frequency band below 8 GHz.

DETAILED DESCRIPTION

Figure 1:
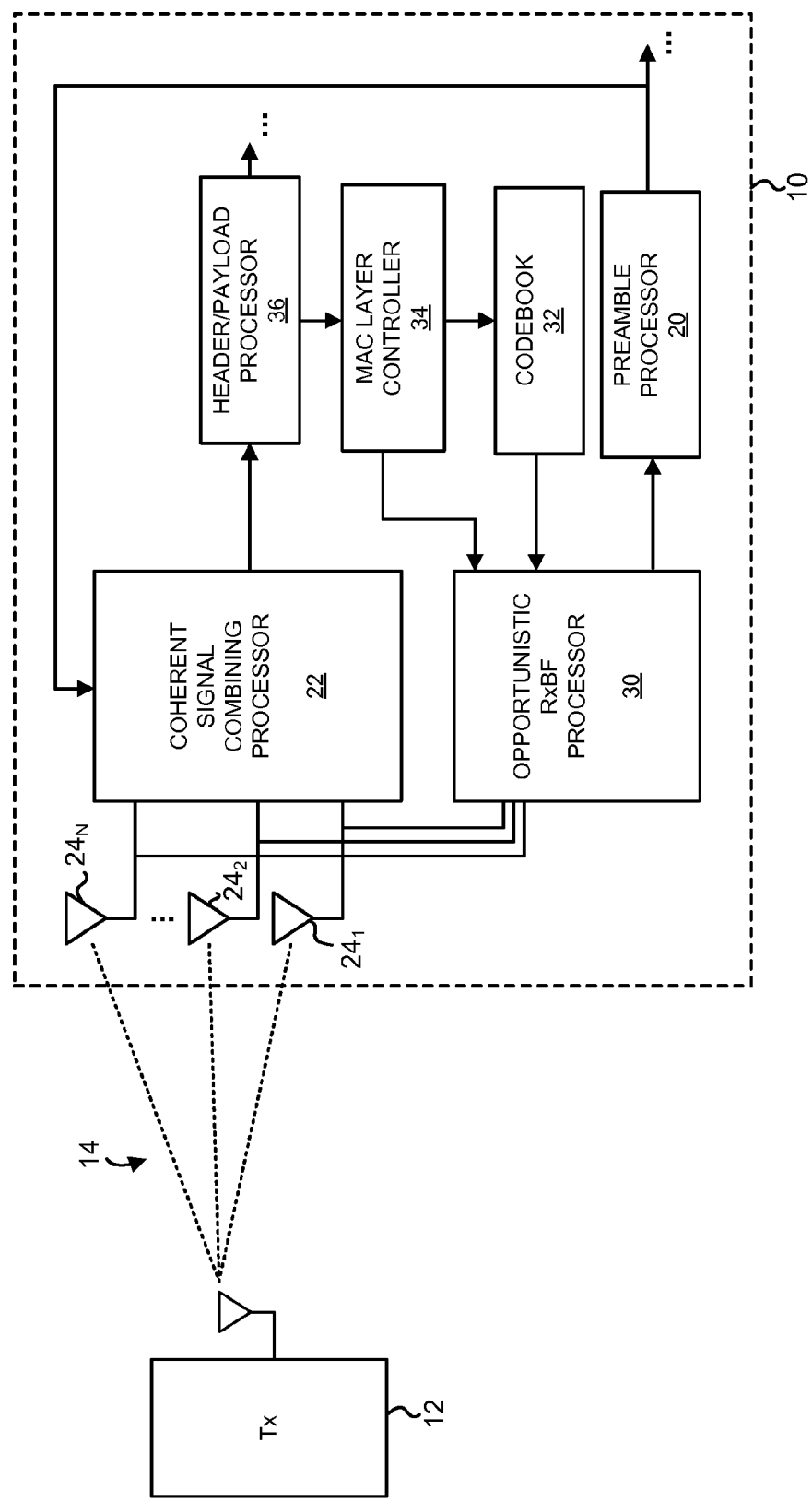
FIG. 1 is a block diagram of a multi-antenna receiver that uses opportunistic receive beamforming, in accordance with an embodiment of the present disclosure, to efficiently process a preamble of a data unit transmitted from another device operating in an example wireless communication system.

FIG. 1 illustrates a multi-antenna receiver 10 that implements opportunistic receive beamforming (RxBF) to efficiently and accurately conduct carrier sensing and/or symbol timing synchronization when receiving data from a transmitter 12 via a wireless communication channel 14, according to an embodiment of the present disclosure. In general, the transmitter 12 communicates data to the receiver 10 using data units that include a preamble followed by physical-layer (PHY) header and payload portions, example formats of which are discussed below with reference to FIGS. 2A and 2B. A preamble processor 20 of the receiver 10 uses the preamble for some or all of carrier sensing, symbol timing synchronization, channel estimation, etc. Upon processing the preamble, the preamble processor 20 derives channel information and provides the derived information to a coherent signal combining processor 22. When processing the subsequent portions of the data unit, the coherent signal combining processor 22 uses the channel information to coherently combine signal components received via respective antennas $24_1, 24_2, \ldots 24_N$ and subsequently propagated via respective receive chains (not shown). In particular, the coherent signal combining processor 22 applies gain coefficients specific to each propagation channel, each gain coefficient including an amplitude component and/or a phase component, to create an efficient gain pattern and thereby improve transmission reliability between the transmitter 12 and the receiver 10.

On the other hand, to create an effective gain pattern when receiving the preamble of a data unit, an opportunistic receive beamforming (opp-RxBF) processor 30 in one embodiment selects one or several steering vectors from a codebook 32 as the preamble is being received and applies the one or several steering vectors in parallel to the received signal to obtain one or several beamformed signals. The opp-RxBF processor 30 then uses the beamformed signals to conduct carrier sensing and/or symbol timing synchronization in accordance with one of the approaches described below, or using a technique generally similar to these approaches. In those situations where multiple steering vectors are applied to the received signal, the opp-RxBF processor 30 in different embodiments analyzes the beamformed signals in time domain or in frequency domain, as discussed with reference to FIGS. 4, 5, 9-10 and FIGS. 6-8, respectively. Further, depending on configuration and device capabilities, the receiver 10 and the transmitter 12 communicate in an OFDM mode or in an SC mode. Several example techniques applicable to the OFDM mode are discussed with reference to FIGS. 4-8, and example techniques applicable to the SC mode are discussed with reference to FIGS. 9 and 10.

In some embodiments, the steering vectors stored in the codebook 32 define a set of N orthogonal vectors, where N is the number of receive antennas $24_1, 24_2, \ldots 24_N$. In one such embodiment, the N vectors are also normalized, i.e., the N vectors define an orthonormal set. Further, the steering vectors for the codebook 32 in another embodiment can be selected from rows of a Hadamard matrix, a Discrete Fourier Transform (DFT) matrix, or another suitable matrix. Each steering vector is a single-row vector with N columns according to some embodiments of the opp-RxBF processor 30. However, the number of steering vectors need not match the number of receive antennas $24_1, 24_2, \ldots 24_N$. For example, the receiver 10 in an embodiment is equipped with four receive antennas but the opp-RxBF processor 30 applies only two steering vectors to the received signal. In general, the codebook 32 can store any desired number of steering vectors.

In some embodiments, the opp-RxBF processor 30 operates in an ad-hoc manner in that some or all vectors from the codebook 32 are selected as a data unit is received. In other embodiments, the opp-RxBF processor 30 operates in a tracking mode in which a media access channel (MAC) layer controller 34 specifies which of the steering vectors in the codebook 32 the opp-RxBF processor 30 should apply and when the opp-RxBF processor 30 should switch to another steering vector. To this end, the MAC layer controller 34 in one embodiment relies on information included in the header or in the payload of a previously received data unit, and interacts with a header/payload processor 36. Tracking mode of operation is discussed in more detail below with reference to FIG. 11. In an embodiment, the opp-RxBF processor 30 implements both the ad-hoc and tracking techniques, and selects the appropriate technique based on a configuration option or according to another selection principle. In other embodiments, the opp-RxBF processor 30 implements only one of the ad-hoc and tracking techniques It is noted that although the transmitter 12 in this example embodiment has only one antenna, the receiver 10 in general can communicate with devices equipped with one or several transmit antennas.

Next, example formats of data units used in OFDM and SC modes are discussed with reference to FIGS. 2A and 2B, respectively, followed by a description of a mathematical model that describes certain communications via the channel 14. For clarity, a prior art preamble processor that processes the preambles of data units of FIGS. 2A-B is then discussed with reference to FIG. 3 prior to a more detailed discussion of opportunistic receive beamforming techniques of the present disclosure.

Figure 2A:
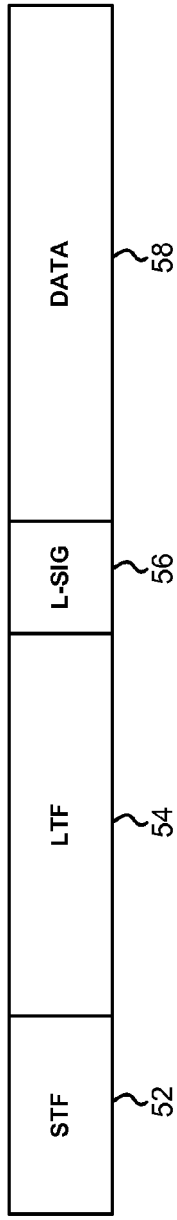
FIG. 2A is a diagram of an example format for a data unit for Orthogonal Frequency Division Multiplexing (OFDM) mode.

Referring first to FIG. 2A, an OFDM mode data unit 50, according to an embodiment, includes a short training field (STF) 52, a long training field (LTF) 54, a legacy OFDM signal field (L-SIG) 56, and a data portion 58. The STF 52 includes several repetitions of a certain sequence and is generally associated carrier sensing and symbol timing synchronization, and the LTF 54 is generally associated with channel estimation information. Thus, a receiving device such as the receiver 10 of FIG. 1 can recognize the sequence in the STF 52 and thus determine that a data unit is being received.

Figure 2B:
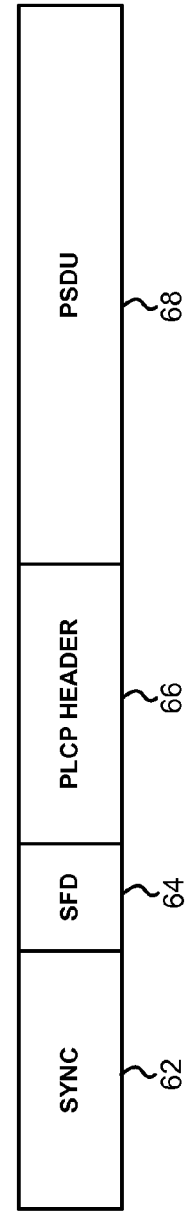
FIG. 2B is a diagram of an example format for a data unit for Single Carrier (SC) mode.

Now referring to FIG. 2B, an SC mode data unit 60, according to an embodiment, includes a synchronization (SYNC) field 62, a Start Frame Delimiter (SFD) 64, a Physical Layer Convergence Procedure (PLCP) header 66, and a PLCP service data unit (PSDU) 68. The SYNC field 62 is generally composed of alternating ones and zeroes defining a pattern. Similar to the STF 52 of the OFDM data unit 50, the pattern allows a receiving device to recognize that a communication frame is to follow. The beginning of the communication frame is marked by the SFD 64. The PLCP header 66 is a portion of the frame and PHY parameters of the PLCP sublayer, and is followed by the PSDU 68 that includes the payload.

Referring back to FIG. 1, the transmitter 12 transmits the preamble of a data unit consistent with the format 50 or 60 as a single data stream s both in the OFDM and the SC mode of operation, although the remainder of the data unit can be transmitted using multiple streams in the OFDM mode, according to an embodiment. For the receiver 12 that includes N receive antennas, the received signal component $y_i$ at a receive chain i can be represented as $$y_i = h_i s + n_i, \text{ where } i=1,2,\ldots N, \quad (Eq. 1)$$

and where $h_i$ is the gain and $n_i$ is the noise associated with the i-th receive chain. In a matrix form, the signal received via the antennas $24_1, 24_2, \ldots 24_N$ and the channel H is then given by:

$$y = Hs+n, \quad (Eq. 2)$$

where $$y = \begin{bmatrix} y_1 \\ y_2 \\ \vdots \\ y_N \end{bmatrix}, H = \begin{bmatrix} h_1 \\ h_2 \\ \vdots \\ h_N \end{bmatrix},$$

and $$n = \begin{bmatrix} n_1 \\ n_2 \\ \vdots \\ n_N \end{bmatrix}$$

For the data portion d transmitted using a single stream, the received signal component $y_i^{data}$ at a receive chain i can be represented as $$y_i^{data} = h_i d + n_i \quad (Eq. 3)$$

When coherent combining is applied for a single-stream transmission, the received data d' is given by $$d' = \sum_{i=1}^{N} \|h_i\|^2 d + n', \quad (Eq. 4A)$$

where n' is given by $$n' = \frac{H^T n}{\|H\|}, \quad (Eq. 4B)$$

where $M^T$ denotes the Hermitian (conjugate) transpose of the matrix M. Thus, the received data d' is the dot product of the vector y and the unit vector H/norm(H). It is noted that coherent combining according to Eq. 4A is equivalent to performing receive beamforming RxBF or to using a "smart receive antenna" that coherently multiples gain factors at each receive path to form a beam that points, generally, in the direction of an incoming signal.

It is further noted that when $N_{TS}$ streams are used in an OFDM mode, the channel H is given by:

$$H = \begin{bmatrix} h_{1,1} & h_{1,2} & \ldots & h_{1,N_{TS}} \\ h_{2,1} & h_{1,2} & \ldots & h_{2,N_{TS}} \\ \vdots & \vdots & \vdots & \vdots \\ h_{N,1} & h_{N,2} & \ldots & h_{N,N_{TS}} \end{bmatrix}, \quad \text{(Eq. 5)}$$

and coherent combing of the data d accordingly accounts for variations across the $N_{TS}$ streams in accordance with any known and/or suitable technique.

Figure 3:
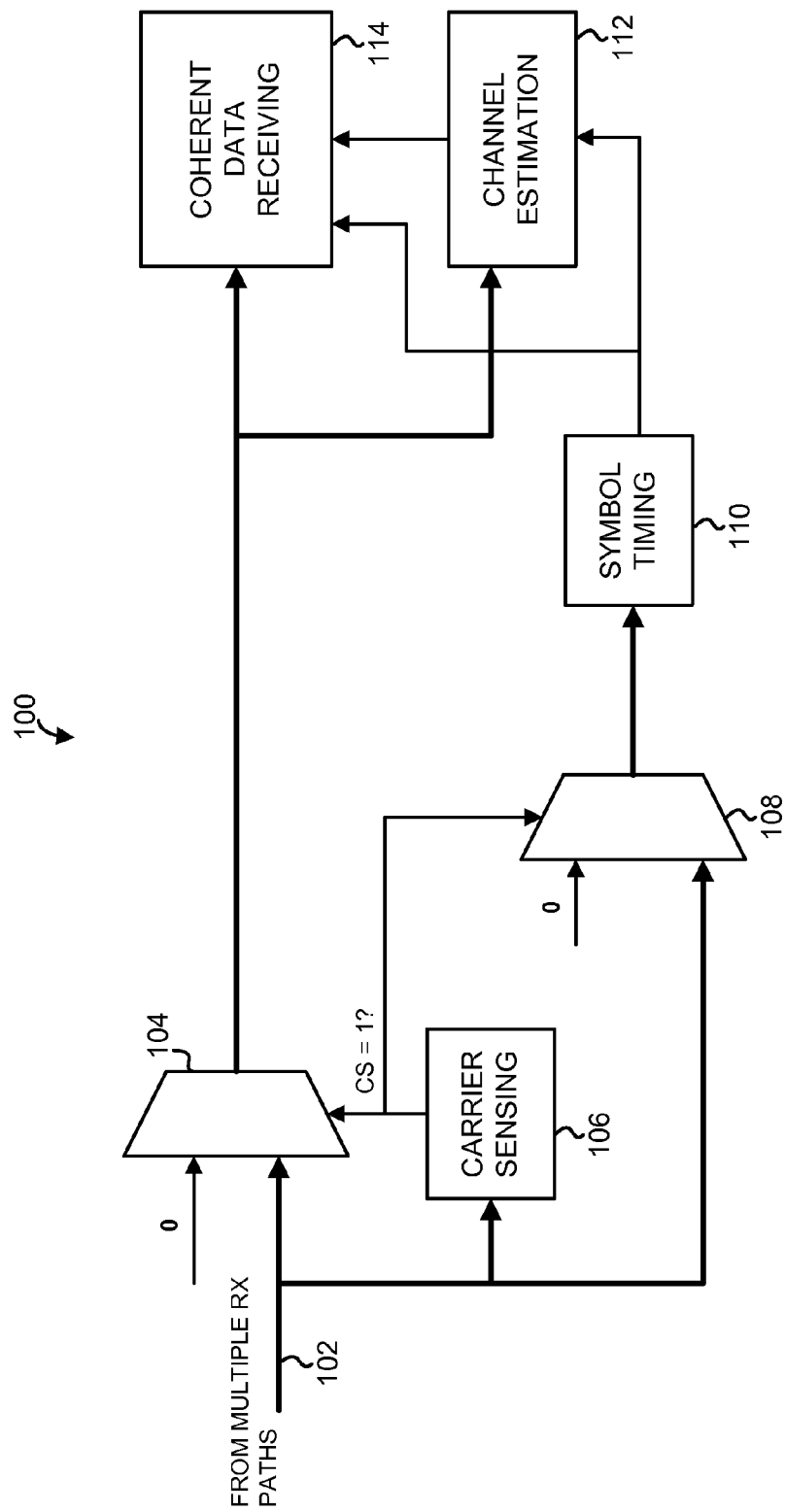
FIG. 3 is a block diagram of a prior art preamble processor.

FIG. 3 illustrates a prior art preamble processor 100 that operates in a multiple-antenna receiver generally similar to the receiver 10. The preamble processor 100 receives a signal from multiple antennas via a path 102 that is coupled, along with a logical zero, to a multiplexer 104 and to a multiplexer 108 (in FIGS. 3-11, thicker lines signify a path comprising a group of parallel sub-paths). The path 102 is also coupled to a carrier sensing unit 106 that controls the selection of one of the two inputs of the multiplexer 104, as well the selection of one of the two similar inputs of the multiplexer 108. The output of the multiplexer 108 is coupled to the symbol timing unit 110 the output of which in turn is coupled to a channel estimation unit 112 and a coherent data receiving unit 114. The channel estimation unit 112 estimates channel gain coefficients and supplies these coefficients to the coherent data receiving unit 114, so that the coherent data receiving unit 114 can coherently combine signal components received via respective sub-paths.

In operation, the preamble processor 100 receives a data unit formatted according to the format illustrated in FIG. 2A, for example. When the carrier sensing unit 106 detects a carrier by recognizing the sequence in the STF 52, the path 102 is selected at the multiplexer 104 and the signal propagated via the path 102 is directed to the coherent data receiving unit 114. Further, the path 102 is selected at the multiplexer 104 and the symbol timing unit 110 begins to synchronize symbol timing. It is noted that until the carrier sensing unit 106 detects a carrier, and until the channel estimation unit 112 generates channel gain coefficients, the coherent data receiving unit 114 cannot coherently combine the signal supplied on the path 102. Referring back to FIG. 2A, for example, the preamble processor 100 can apply coherent combining given by (Eq. 4A), for example, only to the fields 56 and 58. Similarly, referring to FIG. 2B, the preamble processor 100 can apply coherent combining given by (Eq. 4A) only to the fields 64-68.

When receiving the preamble of a data unit (e.g., the fields 52-54 or 62), the prior art preamble processor 100 applies only noise averaging given by $$z = \sum_{i=1}^{N} y_i, \quad \text{(Eq. 6)}$$

where z is the composite signal corresponding to the preamble received via N antennas. It is noted that the approach consistent with (Eq. 6) may provide significantly less sensitivity as compared to beamforming and, as a result, less reliability than coherent combining given by (Eq. 4A). In fact, carrier sensing and symbol timing synchronization provided by the prior art preamble processor 100 often become a bottleneck for incoming communications at a receiving device. This is especially true when a data unit is transmitted from a multi-antenna transmitter using an efficient steering (beamforming) vector to increase the effective data rate, or when advanced channel estimation techniques are available at the receiving device.

Figure 4:
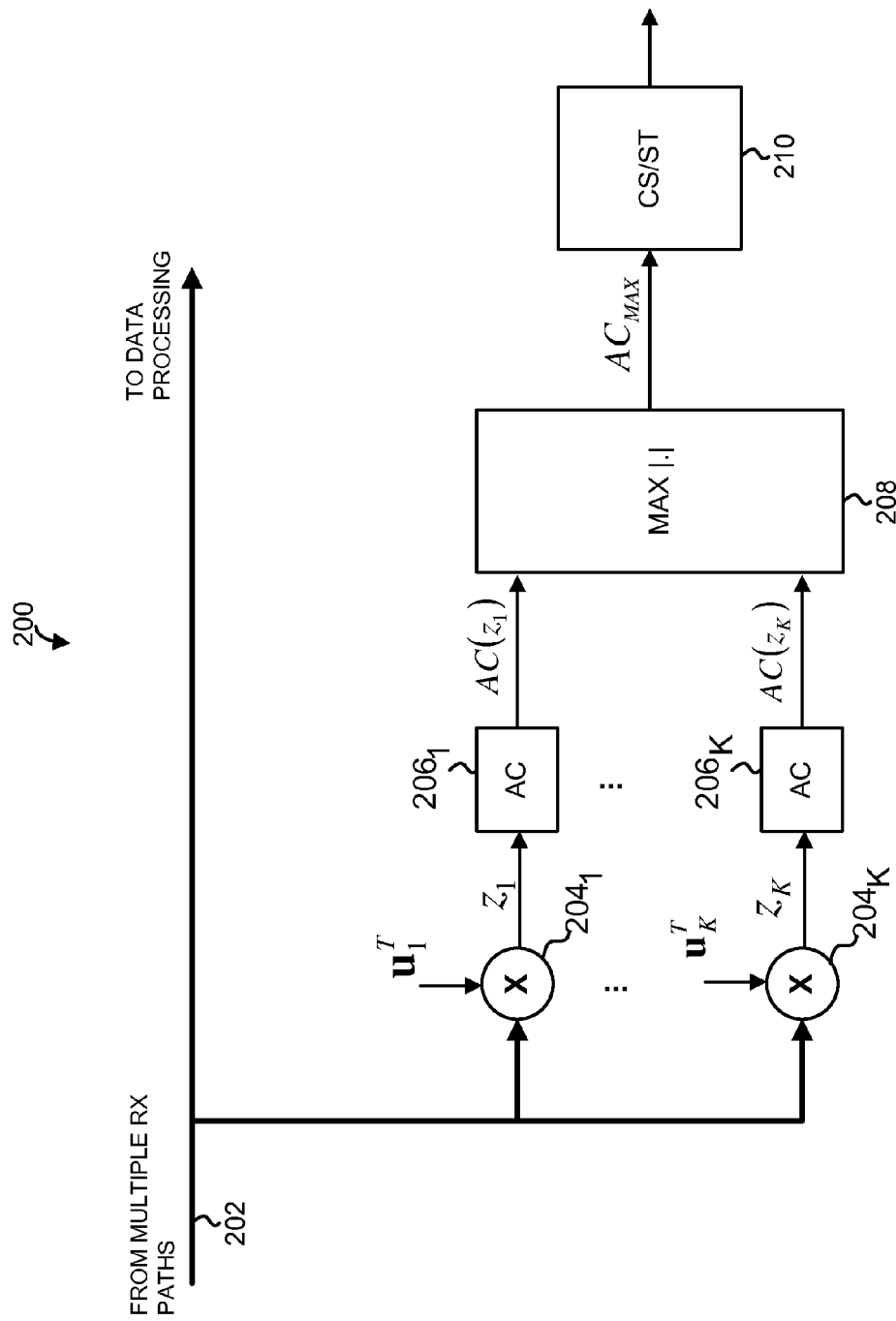
FIGS. 4 and 5 are block diagrams of time-domain OFDM opportunistic receive beamforming (opp-RxBF) processors that operate in the receiver of FIG. 1, according to respective embodiments of the present disclosure.

Now referring to FIG. 4, a time-domain OFDM opp-RxBF processor 200 is used as the opp-RxBF processor 30 in one embodiment of the receiver 10, if the transmitter 12 and the receiver 10 operate in the OFDM mode, for example. As discussed above, the receiver 10 in the embodiment of FIG. 1 includes N receive antennas. The opp-RxBF processor 200 receives a signal y via the path 202. In the illustrated embodiment, the path 202 is coupled to each of K vector multipliers $204_1 \ldots 204_K$ via a respective branch so that K steering vectors $u_1^T \ldots u_K^T$ can be applied in parallel to the signal y to generate K outputs $z_1 \ldots z_K$. Each branch of the path 202 coupled to one of the vector multipliers $204_1 \ldots 204_K$ includes the same number of sub-paths as the path 202. Vector multiplication at the vector multiplier $204_k$ for an output $z_K$ is given by:

$$z_k = u_k^T y = [u_{k1^*} \ldots u_{kN}^*] \begin{bmatrix} y_1 \\ \vdots \\ y_N \end{bmatrix} = \sum_{i=1}^{N} y_{ki}^* u_{ki}, \quad \text{(Eq. 7)}$$

$$k = 1 \ldots K.$$

In an embodiment, the K steering vectors $u_1^T \ldots u_K^T$ are selected from a codebook (not shown in FIG. 4) that stores two or more vector such as the codebook 32 illustrated in FIG. 1. For example, the opp-RxBF processor 200 in an embodiment receives the steering vectors $u_1^T \ldots u_K^T$ from a codebook that stores N orthonormal vectors, i.e., K=N. In general, however, the opp-RxBF processor 200 includes any number of branches. As one specific example, K=N=2, and the codebook provides $u_1=[1\ 1]^T$ and $u_2=[1\ -1]^T$. As another example, K=4 and N=2, and the codebook provides $u_1=[1\ 1]^T$, $u_2=[1\ -1]^T$, $u_3=[1\ 1]^T$, and $u_1=[1-j]^T$.

The output of each of the vector multipliers $204_1 \ldots 204_K$ is coupled to a respective input of an autocorrelation calculator $206_1 \ldots 206_K$ that generates a respective autocorrelation output for the respective signals $z_1 \ldots z_K$. To this end, the autocorrelation calculators $206_1 \ldots 206_K$ can implement any suitable techniques, including those known in the art. For example, each of the autocorrelation calculators $206_1 \ldots 206_K$ in one embodiment comprises an angle correlator. In another embodiment, the autocorrelation calculators $206_1 \ldots 206_K$ are 1-bit correlators. In yet another embodiment, the autocorrelation calculators $206_1 \ldots 206_K$ are full-precision correlators.

In the embodiment of FIG. 4, the autocorrelation outputs $AC(z_1) \ldots AC(z_K)$ are provided as inputs to a maximum correlation selector 208 that selects an autocorrelation outputs from the outputs $AC(z_1) \ldots AC(z_K)$ according to one or more suitable criteria. For example, the maximum correlation selector 208 in one embodiment selects an autocorrelation output having the largest magnitude and provides the selected autocorrelation output $AC_{MAX}$ to a carrier sensing/symbol timing synchronization unit 210. In an embodiment, the unit 210 analyzes peaks in the autocorrelation output $AC_{MAX}$ by comparing the height of the peaks to one or several predefined criteria (e.g., the unit 210 detects when the $AC_{MAX}$ exceeds a threshold). An output of the unit 210 is an indication that a carrier is detected, according to an embodiment. The unit 210 further implements any suitable symbol timing synchronization algorithm to identify the start of OFDM symbols. In an embodiment, an output of the unit 210 provides symbol timing information.

In this manner, the opp-RxBF processor 200 improves the receive gain when processing the preamble data unit, and consequently increases the probability that incoming data units are detected accurately and in a timely manner. In a sense, the opp-RxBF processor 200 uses ad-hoc opportunistic beamforming to make up the gap between beamforming gains associated with processing preambles of data units, and beamforming gains associated with processing header/payload portions of data units.

In an embodiment, an opp-RxBF processor similar to the opp-RxBF processor 200 includes only one branch (i.e., K=1), and accordingly multiplies the signal y by only one steering vector at a time. In this case, the opp-RxBF processor effectively performs noise averaging. To improve the receive gain associated with processing a preamble in this embodiment, the steering vector may be different from $u_1=[1 \ldots 1]^T$ when a beamforming vector is applied.

Figure 5:
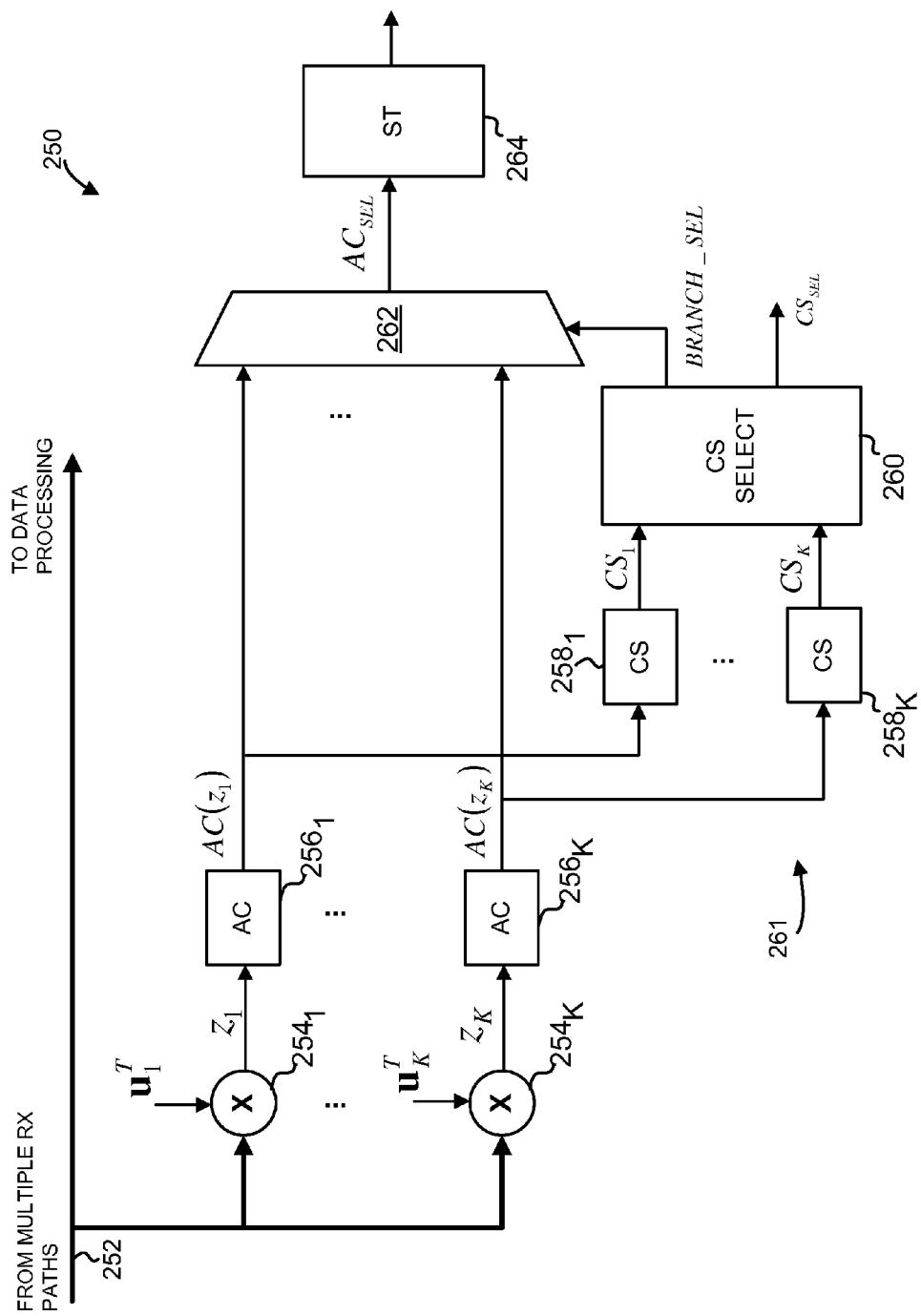

Referring to FIG. 5, a time-domain OFDM opp-RxBF processor 250 is used as the opp-RxBF processor 30 in another embodiment of the receiver 10 when the transmitter 12 and the receiver 10 operate in the OFDM mode. Similar to the opp-RxBF processor 200 of FIG. 4, the opp-RxBF processor 250 includes a path 252 via which a signal y is received from multiple antennas. As discussed above, for a device with N receive antennas, the path 252 includes N sub-paths to convey N components of the signal y (i.e., $y_1 \ldots y_N$). The path 252 is coupled to each of K vector multipliers $254_1 \ldots 254_K$ via a respective branch so that K steering vectors $u_1^T \ldots u_K^T$ can be applied in parallel to the signal y to generate K outputs $z_1 \ldots z_K$ that are coupled to respective autocorrelation calculators $256_1 \ldots 256_K$. In this embodiment, the autocorrelation outputs $AC(z_1) \ldots AC(z_K)$ are coupled to respective carrier sensing units $258_1 \ldots 258_K$ that generate carrier sensing metrics $CS_1 \ldots CS_K$ coupled to carrier sensing output selector 260. Together, the carrier sensing units $258_1 \ldots 258_K$ and the carrier sensing output selector 260 define a carrier sensing module 261. The carrier sensing units $258_1 \ldots 258_K$ in one embodiment generate metrics indicative of how well the peaks in the autocorrelation output $AC_{MAX}$ match certain predefined criteria. Further, the autocorrelation outputs $AC(z_1) \ldots AC(z_K)$ in this embodiment are provided to a multiplexer 262 in which the selection between the autocorrelation outputs $AC(z_1) \ldots AC(z_K)$ is controlled by an output of the carrier sensing output selector 260. In other words, the carrier sensing output selector 260 selects the "best" (e.g., highest) carrier sensing metric $CS_{SEL}$ from among the metrics $CS_1 \ldots CS_K$ and selects an autocorrelation output $AC_{SEL}$ from among the outputs $AC(z_1) \ldots AC(z_K)$ that is associated with the selected metric.

The sensing output selector 260 also provides the selected carrier $CS_{SEL}$ as output. Further, the selected autocorrelation output $AC_{SEL}$ is provided to a symbol timing synchronization unit 264 to determine the start of an OFDM symbol.

Generally with respect to FIGS. 4 and 5, the technique illustrated in these embodiments effectively raises autocorrelation output magnitude when Signal-to-Noise (SNR) ratio is low. Accordingly, in an embodiment, a receiver that implements the opp-RxBF processor 200 or 250 can be configured with a relatively high threshold for autocorrelation output magnitude but still maintains a low percentage of false negatives (i.e., missed detections of actual preambles) and as well a low percentage of false positives (i.e., false detections of preambles).

Also, because the approach discussed with reference to FIGS. 4 and 5 is applied to a received signal in the time-domain, this technique is particularly effective as applied to short delay-dispersive channels because longer channels may be affected by inter-symbol interference (ISI). Further, the technique is still effective when applied to long multi-path channels. In one such embodiment, the received signal model with channel convolution is adjusted to:

$$y_i[t] = \sum_l h_{i\_l} s[t-l] + n_i[t], i = 1, \ldots N \qquad \text{(Eq. 8)}$$

and the corresponding opportunistic RxBF processor obtains at least a partial beamforming gain on some of the multi-path channel taps.

Figure 6:
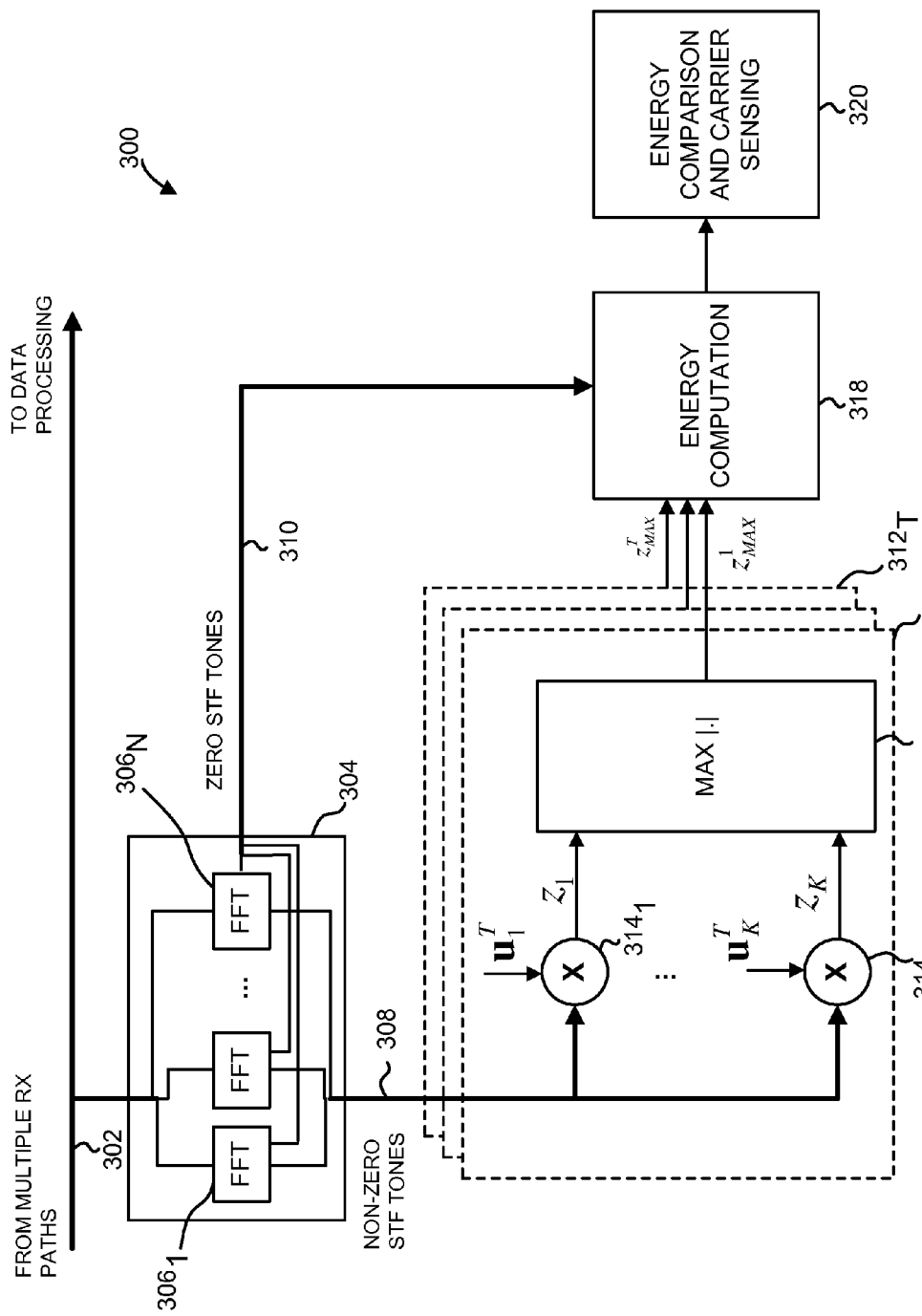
FIGS. 6-8 are block diagram of frequency-domain OFDM opp-RxBF processors that operate in the receiver of FIG. 1, according to respective embodiments of the present disclosure.

Now referring to FIG. 6, a frequency-domain OFDM opp-RxBF processor 300 operates as opp-RxBF processor 30 in another embodiment of the receiver 10 (see FIG. 1). The opp-RxBF processor 300 carries out carrier sensing in the frequency domain by detecting tonal patterns in a frequency-domain representation of a signal y received via N receive antennas and propagated via a path 302. Generally speaking, an opp-RxBF processor such as the opp-RxBF processor 300 measures the sum of the energies of non-zero tones of an STF, such as the STF 52 illustrated in FIG. 2A (hereinafter, "non-zero STF tones"), individual energies of non-zero STF tones, sums of the energies for various subsets of the non-zero STF tones, etc. and compare the measurements to an energy floor defined by the remaining zero tones of the STF (hereinafter, "zero STF tones"). As used herein, the term "non-zero STF tone" refers to a frequency-domain tone transmitted at a non-zero energy level in the STF. Accordingly, the term "zero STF tone" refers to a frequency-domain tone not transmitted (or transmitted at the zero energy level) in the STF. Referring back to FIG. 2A, the STF 52 in an embodiment includes two OFDM symbols, each of which includes one non-zero tone for every four tones. Thus, the time-domain signal corresponding to the STF 52 is a periodic signal including ten periods.

In the illustrated embodiment, a frequency-domain conversion unit 304 converts each signal component $y_1 \ldots y_N$ on a corresponding sub-path of the path 302 to the frequency domain using a respective FFT unit $306_1 \ldots 306_N$. The frequency-domain conversion unit 304 applies an FFT window equal to the duration of an OFDM symbol, in an embodiment. In other embodiments, the frequency-domain conversion unit 304 includes components other than FFT units to compute a Discrete Fourier Transform (DFT). The T non-zero STF tones used in pattern detection and associated with the received signal y are provided to T tone-specific signal selectors $312_1 \ldots 312_T$ via a path 308, and the U remaining zero STF tones are provided as one of the inputs to an energy computation unit 318 via a path 310 to provide a floor or reference basis, according to an embodiment. In an embodiment, the T non-zero STF tones correspond to all non-zero STF tones in the corresponding STF. In another embodiment, the T non-zero STF tones correspond to a subset of the non-zero STF tones used in the STF.

In an embodiment, each of the tone-specific signal selectors $312_1 \ldots 312_T$ includes K vector multipliers $204_1 \ldots 204_K$ to apply respective steering vectors $u_1^T \ldots u_K^T$ and generate K outputs $z_1 \ldots z_K$. The outputs $z_1 \ldots z_K$ are provided to a selector 316 that selects the best (e.g., maximum) output $z_{MAX}{}^i$ from the outputs $z_1 \ldots z_K$ for each of the T non-zero STF tones. An energy computation unit 318 then calculates the energy associated with the corresponding $z_{MAX}{}^i$, i=1, 2, ... T selections of T non-zero STF tones (for ease of illustration, only one tone-specific signal selector $312_1$ is depicted in FIG. 6 with an output $z_{MAx}{}^1$.). An energy comparison and carrier sensing unit 320 then compares the output of the energy computation unit 318 to one or several predefined criteria to carry out carrier sensing.

Figure 7:
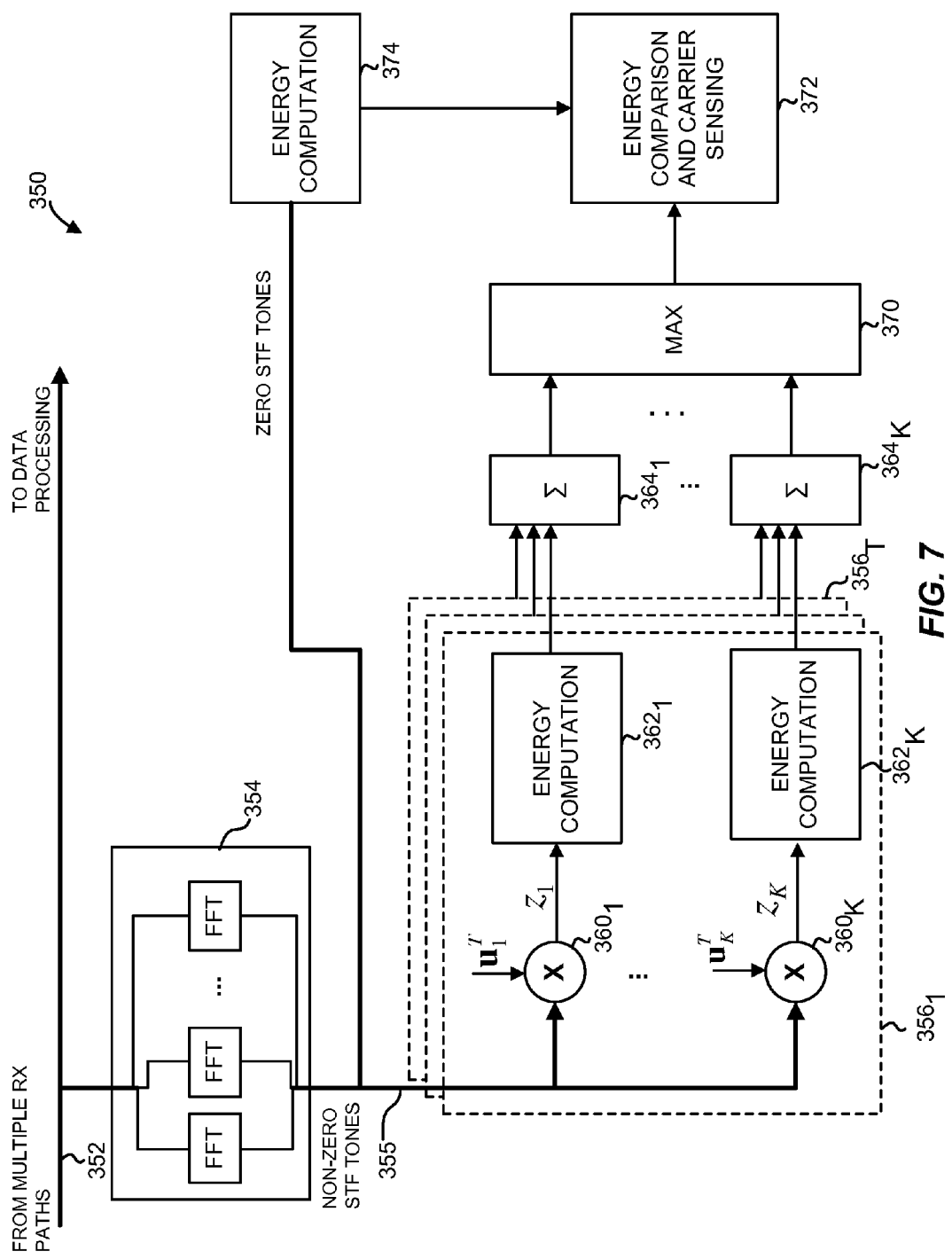

FIG. 7 illustrates a frequency-domain OFDM opp-RxBF processor 350 according to another embodiment. The opp-RxBF processor 350 is generally similar to the opp-RxBF processor 300 except that, in this embodiment, energy is computed and summed across the T zero STF tones for each output of steering matrix. More specifically, the opp-RxBF processor 350 in this embodiment includes a frequency-domain conversion unit 354 that converts each signal component $y_1 \ldots y_N$ on a corresponding sub-path of a path 352 to frequency domain. The frequency-domain conversion unit 354 is the same as or similar to the frequency-domain conversion unit 304 discussed with reference to FIG. 6. The T non-zero STF tones associated with the received signal y are provided to T tone-specific signal selectors $356_1 \ldots 356_T$ via a path 355, and the U zero STF tones are provided as one of the inputs to an energy computation unit 374.

In this embodiment, each of the tone-specific signal selectors $356_1 \ldots 356_T$ includes K vector multipliers $360_1 \ldots 360_K$ to apply respective steering vectors $u_1{}^T \ldots u_K{}^T$ and generate K outputs $z_1 \ldots z_K$. The outputs $z_1 \ldots z_K$ are provided to respective energy computation units $362_1 \ldots 362_K$, and summation units $364_1 \ldots 364_K$ compute respective sums of tone-specific energy computations for each branch of the path 355. As one example, the summation unit $364_1$ computes the total energy of all non-zero tones associated with the output $z_1$, generated by multiplying the signal y by the steering vector $u_1{}^T$.

With continued reference to FIG. 7, a maximum energy selection unit selects the best (e.g., maximum) output of the summation units $364_1 \ldots 364_K$ (according to one or more suitable criteria) and provides the selected output to an energy comparison and carrier sensing unit 372. The energy computation unit 274 computes the energy of the zero STF tones and provides the computed energy to the energy comparison and carrier sensing unit 372 as another input.

Figure 8:
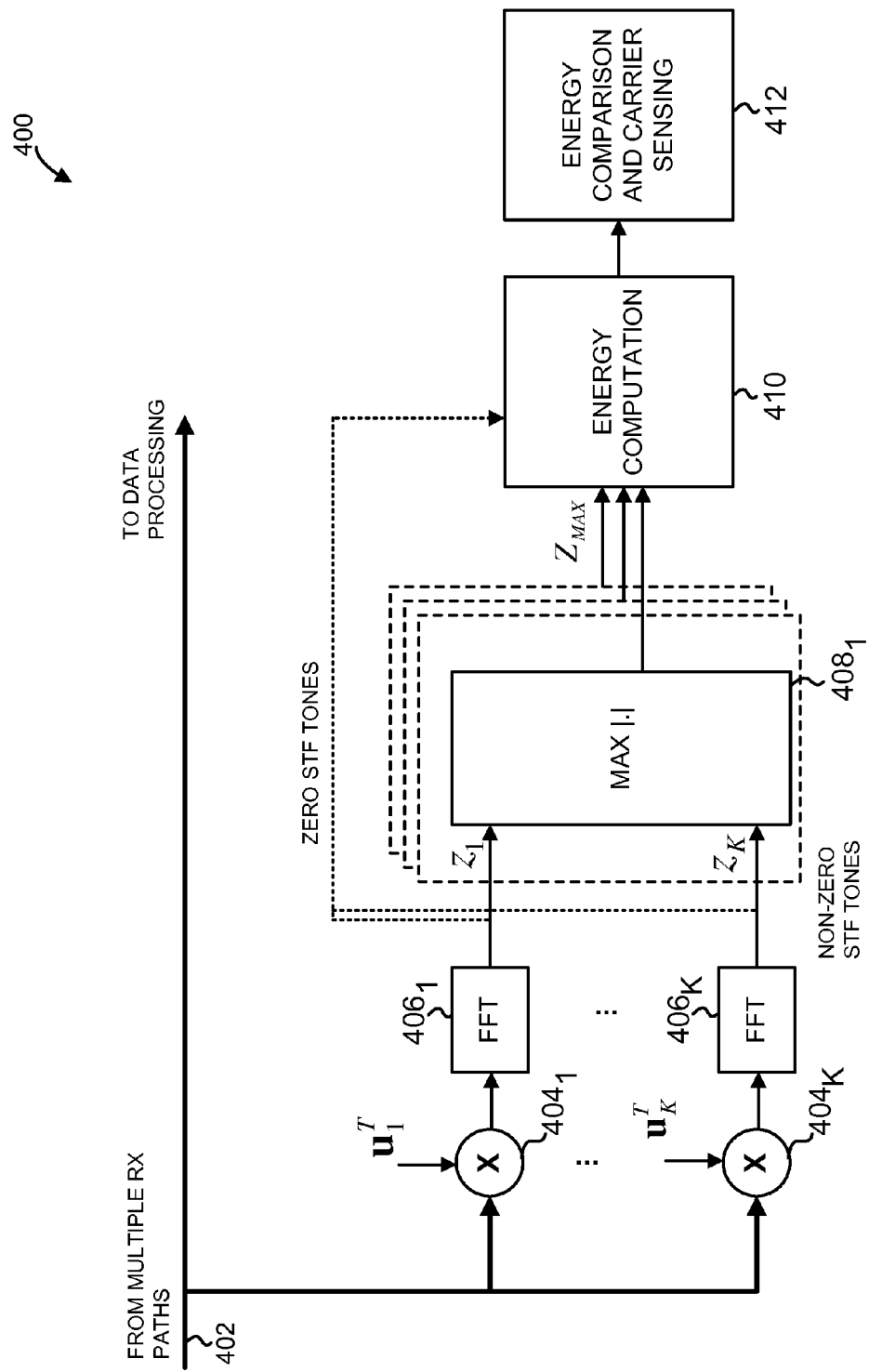

Now referring to FIG. 8, an OFDM opp-RxBF processor 400, according to another embodiment, is generally similar to the opp-RxBF processors 300 and 350, but the opp-RxBF processor 400 applies the steering vectors in the time domain and then converts the result to frequency domain. In particular, the opp-RxBF processor 400 in this embodiment receives a signal y via a path 402 and provides each of K branches to a respective one of vector multipliers $404_1 \ldots 404_K$ that, in turn, provides its output to a respective one of FFT units $406_1 \ldots 406_K$. The outputs $z_1 \ldots z_K$, each carrying the T non-zero tones, are then provided to selectors $408_1 \ldots 408_K$ that select maximum values for each of the T non-zero tones.

An energy computation unit 410 calculates the energy associated with the maximum ones of the T non-zero STF tones in view of the zero STF tones provided as another input, and an energy comparison and carrier sensing unit 412, which in an embodiment is similar to the energy computation unit 372, compares the output of the energy computation unit 410 to one or several predefined criteria to carry out carrier sensing.

Figure 9:
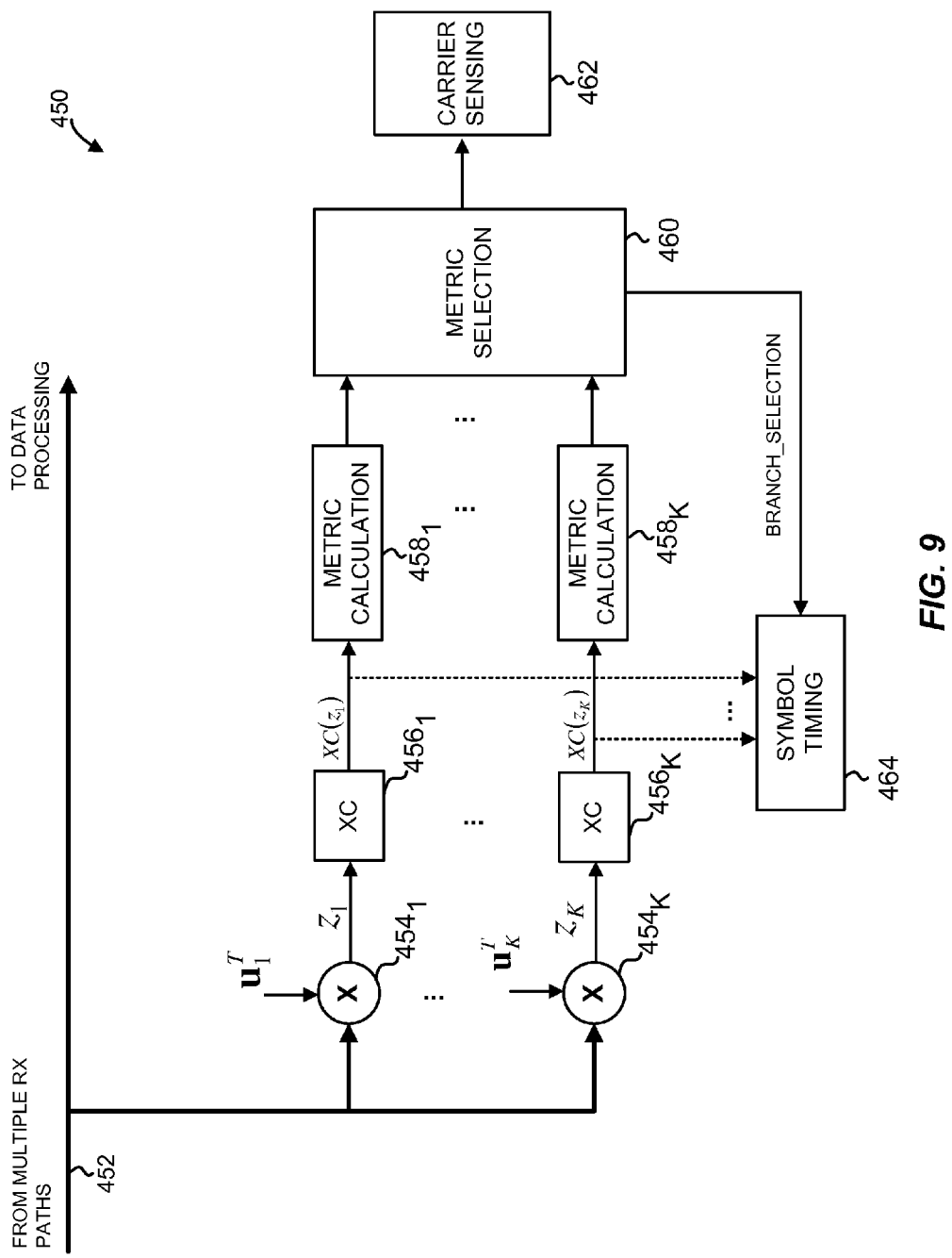
FIGS. 9 and 10 are block diagrams of Single Carrier (SC) opp-RxBF processors that operate in the receiver of FIG. 1, according to respective embodiments of the present disclosure.

Next, example techniques for opportunistic receive beamforming in an SC mode are discussed with reference to FIGS. 9 and 10. Referring first to FIG. 9, a time-domain SC opp-RxBF processor 450, according to an embodiment, receives a signal y via a path 452 and provides a copy of the signal y via a respective branch to each of K vector multipliers $454_1 \ldots 454_K$. In this embodiment, the K outputs $z_1 \ldots z_K$ are provided to K cross-correlators $456_1 \ldots 456_K$, so that the output of a vector multiplier $454_i$ is coupled to an input of a cross-correlator $456_i$. The cross-correlators $456_1 \ldots 456_K$ generate a correlation output based on correlating the outputs $z_1 \ldots z_K$ with an expected pattern. In general, the cross-correlators $456_1 \ldots 456_K$ can implement any suitable cross-correlation techniques, including those known the art.

The outputs $XC(z_1)$ $XC(z_K)$ of cross-correlators $456_1 \ldots 456_K$ are then provided to respective metric calculators $458_1 \ldots 458_K$ to compute highest magnitudes of the taps of the corresponding cross-correlation output during a symbol period, or compute signal quality determined by the ratio of the energy of the peak tap of the cross-correlation output and the sum of the energies of the other taps of the same output during one symbol interval, or generate any other suitable metric. In an embodiment, a metric selection unit 460 then selects the best metric from among the outputs of the metric calculators $458_1 \ldots 458_K$ and provides the selected output to a carrier sensing unit 462. In another embodiment, the metric selection unit 460 selects the output based on two or more metrics (which can be averaged, weight-averaged, etc.).

In some embodiments, the carrier sensing unit 462 compares the output of the metric selection unit 460 to a certain criterion such as a pre-stored metric value, for example. Further, as illustrated in FIG. 9, the metric selection unit 460 in an embodiment specifies which of the selected branches of the path 452 corresponds to the selected output, so that a symbol timing synchronization unit 464 can utilize the corresponding cross-correlation output. Thus, if the metric selection unit 460 selects the output of the metric calculator $458_1$, the symbol timing synchronization unit 464 performs symbol timing synchronization on $XC(z_1)$.

In an embodiment, the symbol timing synchronization unit 464 implements the technique described in a co-pending U.S. patent application Ser. No. 11/957,245, filed on Dec. 14, 2007, and entitled "Bit Sync For Receiver with Multiple Antennas," the entire disclosure of which is hereby incorporated by reference herein.

Figure 10:
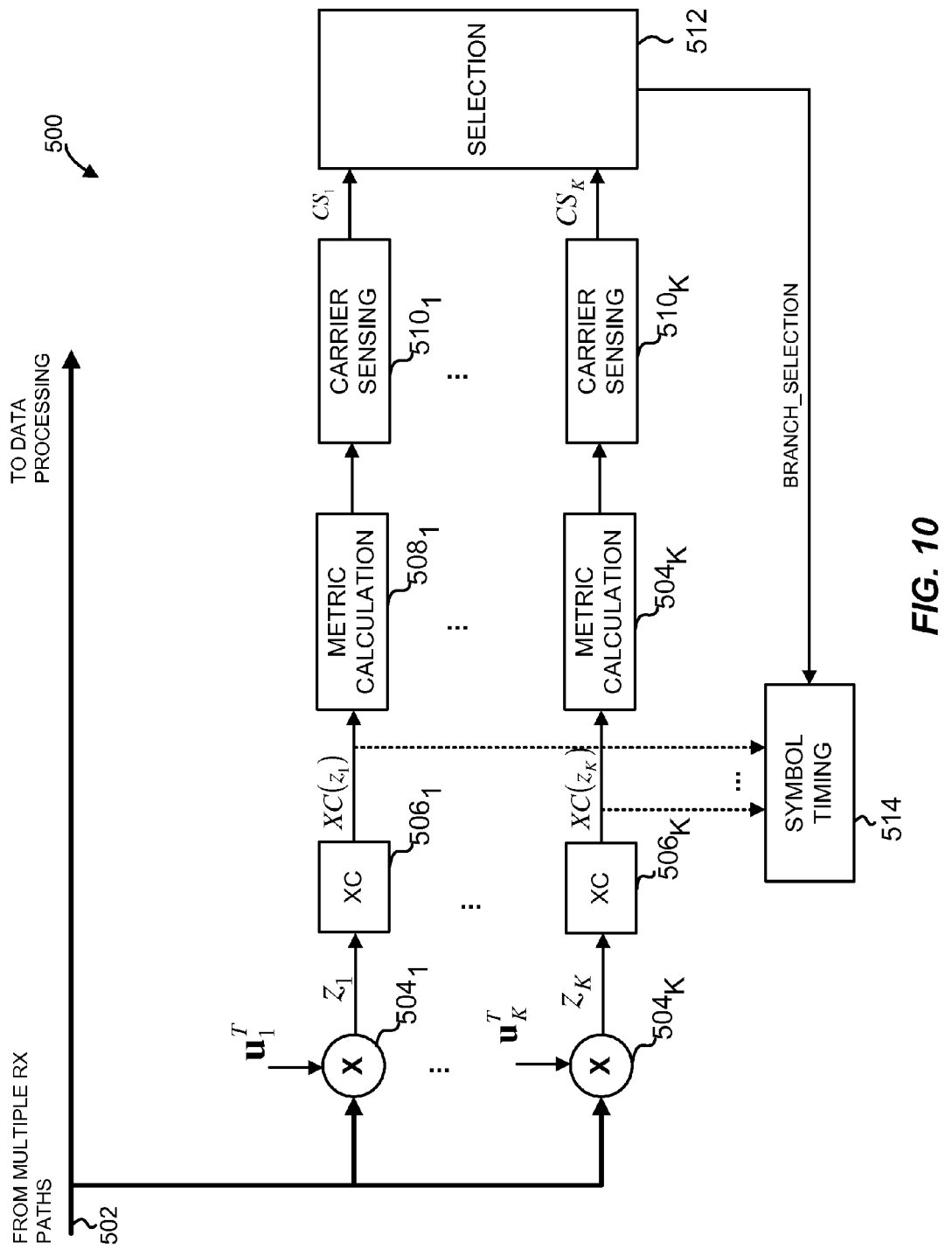

Referring next to FIG. 10, a time-domain SC opp-RxBF processor 500, according to an embodiment, is generally similar to the SC opp-RxBF processor 450. The opp-RxBF processor 500 receives a signal y via a path 502 and provides a copy of the signal y via a respective branch to each of K vector multipliers $504_1 \ldots 504_K$. In an embodiment, the K outputs $z_1 \ldots z_K$ are provided to respective K cross-correlators $506_1 \ldots 506_K$, and the outputs $XC(z_1) \ldots XC(z_K)$ of cross-correlators $506_1 \ldots 506_K$ are then provided to respective metric calculators $508_1 \ldots 508_K$.

Unlike the SC opp-RxBF processor 450, the opp-RxBF processor 500 then directs the outputs of metric calculators $508_1 \ldots 508_K$ to carrier sensing units $510_1 \ldots 510_K$ to conduct carrier sensing analysis, and a selection unit 512 then selects the best result carrier sensing analysis. Together, the carrier sensing units $510_1 \ldots 510_K$ and the selection unit 512 define a carrier sensing module. In an embodiment, selection unit 512 also specifies which of the cross-correlation outputs $XC(z_1) \ldots XC(z_K)$ a symbol timing unit 514 should use.

Thus, similar to the embodiments illustrated in FIGS. 4 and 5, for example, the opp-RxBF processor 450 and 500 improves cross-correlation metrics when a Signal-to-Noise (SNR) ratio is low, for example. Accordingly, in an embodiment, a receiver that implements the opp-RxBF processor 450 or 500 is configured with a relatively high threshold for autocorrelation output magnitude but still maintains a low percentage of false negatives (i.e., missed detections of actual preambles) and as well a low percentage of false positives (i.e., false detections of preambles).

Referring back to FIG. 1, the MAC layer controller 34 in some embodiments selects a steering vector for use by the opp-RxBF processor 30 based on previously received data unit or units. In an embodiment, such a selection helps to avoid unintentional beamforming during an idle period. In at least some of the embodiments consistent with FIGS. 4-10, ad-hoc selection of a steering vector is conducted for each incoming data unit.

Figure 11:
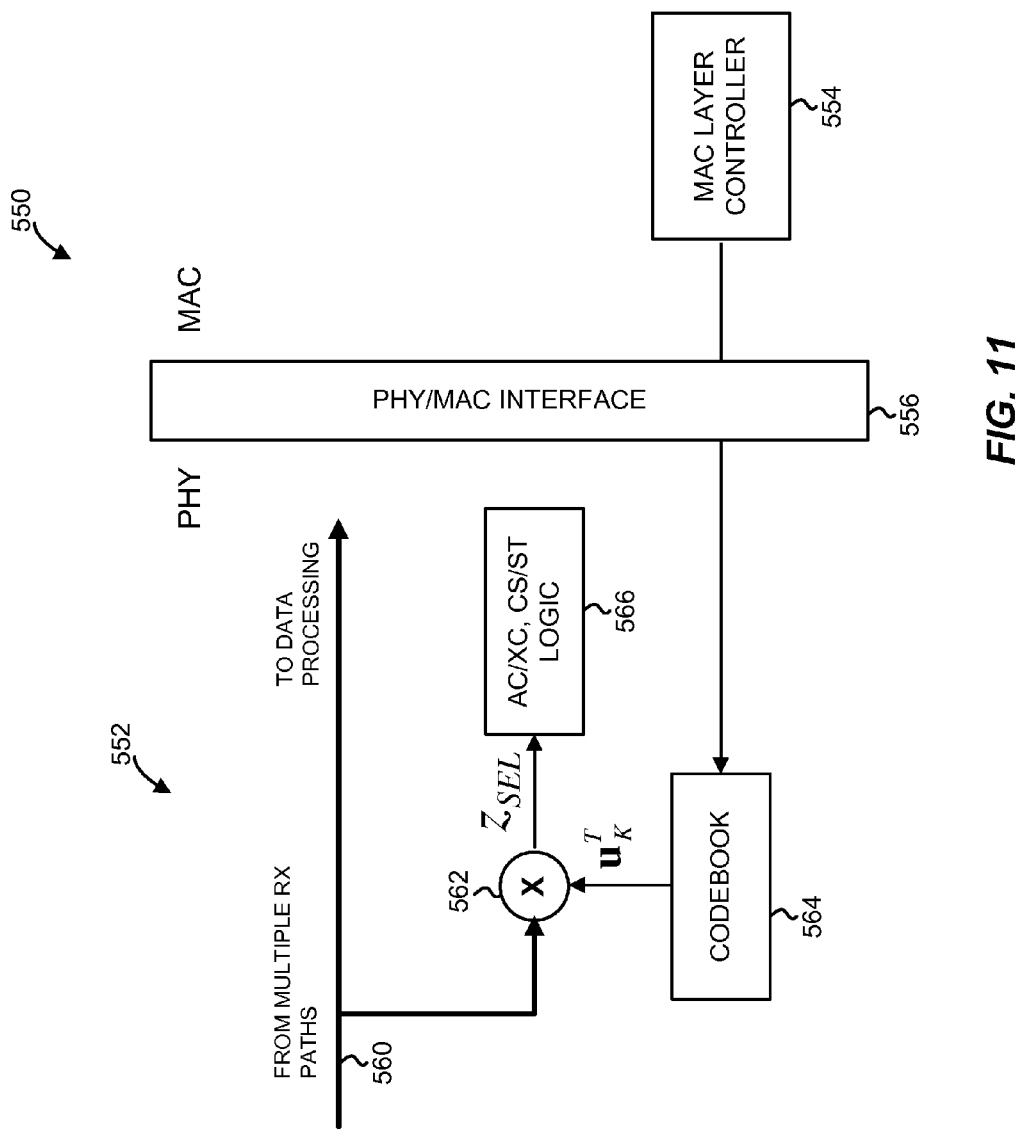
FIG. 11 is a block diagram of an RxBF processor in an example arrangement with a media access channel (MAC) processor according to an embodiment of the present disclosure.

FIG. 11 illustrates an RxBF processor 552, according to an embodiment, in an example arrangement with a MAC layer controller 554 that can be used as the opp-RxBF processor 30 and the MAC layer controller 34, respectively. In particular, the RxBF processor 552 in a receiver operating according to the 802.11a/g/n standard in such frequency bands as, for example, 2.4 GHz, 3.6 GHz, or 5 GHz. To counteract the problems discussed above, the MAC layer controller 554 selects a steering vector based on one or several previously received data units and specifies the selection via a PHY/MAC interface 556 (or using a globally accessible register, for example). For example, the MAC layer controller 554 selects a steering vector that was used during reception of the previous data unit or used during reception of a plurality of previously received data units. The RxBF processor 552 includes a path 560 to receive a signal y from several antennas, and a vector multiplier 562 to apply a steering vector $u_K^T$ selected from a codebook 564 by the MAC layer controller 554. The output $z_{SEL}$ in this embodiment is then processed in a autocorrelation or cross-correlation, symbol timing and carrier sensing pipeline 566 using suitable techniques such as those discussed above. In another embodiment, the steering vector is provided by the MAC layer controller 554.

In an embodiment, the RxBF processor 552 operating at the physical layer applies steering vectors $u_1 \ldots u_K$ over time while the MAC layer controller 554 specifies the selection of a new steering vector and the timing of applying the new vector. In one example scenario, the MAC layer controller 554 determines that a data unit from an access point (AP) is received correctly based on the correctly specified source address and a correctly decoded MAC frame. The MAC layer controller 554 then instructs the RxBF processor 552 to "keep" the currently applied vector in accordance with a so-called "tracking mode." Accordingly, when the next data unit arrives at the receiver that implements the RxBF processor 552 and the MAC layer controller 554, the RxBF processor 552 applies the kept steering vector to increase the beamforming gain during carrier sensing and/or symbol timing synchronization. On the other hand, when the MAC layer controller 554 determines that one or several data units have been missed (e.g., upon timer expiration), the MAC layer controller 554 in an embodiment instructs the RxBF processor 552 to apply a new steering vector.

In some embodiments, the MAC layer controller 554 selects more than one steering vector, and the RxBF processor 552 applies time-domain or frequency-domain techniques discussed above to assess the relative gain associated with each steering vector and select (or construct) an appropriate output.

In yet another embodiment, the MAC layer controller 554 operating in an AP that communicates with multiple stations populates a codebook with steering vectors previously used to communicate with individual stations. Thus, an AP that has previously selected a first steering vector for communicating with a station A and a second steering vector for communicating with a station B causes the RxBF processor 552 to store each of the first steering vector and the second steering vector in the codebook, and apply these vectors in parallel to the received signal.

Generally with respect to FIGS. 4-11, it is noted that, in some embodiments, some of the components such as, for example, the carrier sensing/symbol timing synchronization unit 210 (FIG. 4) or the energy comparison and carrier sensing unit 320 are disposed in a preamble processor of the corresponding receiver (such as the preamble processor 20 of the receiver 10) rather than in the opp-RxBF processor. In general, components and modules of a receiver and/or of an opp-RxBF processor can be grouped, split into sub-modules, and arranged as proper for a given implementation.

Next, several example methods for opportunistic RxBF, or for conducting procedures related to opportunistic RxBF, are discussed with reference to FIGS. 12-20.

Figure 12:
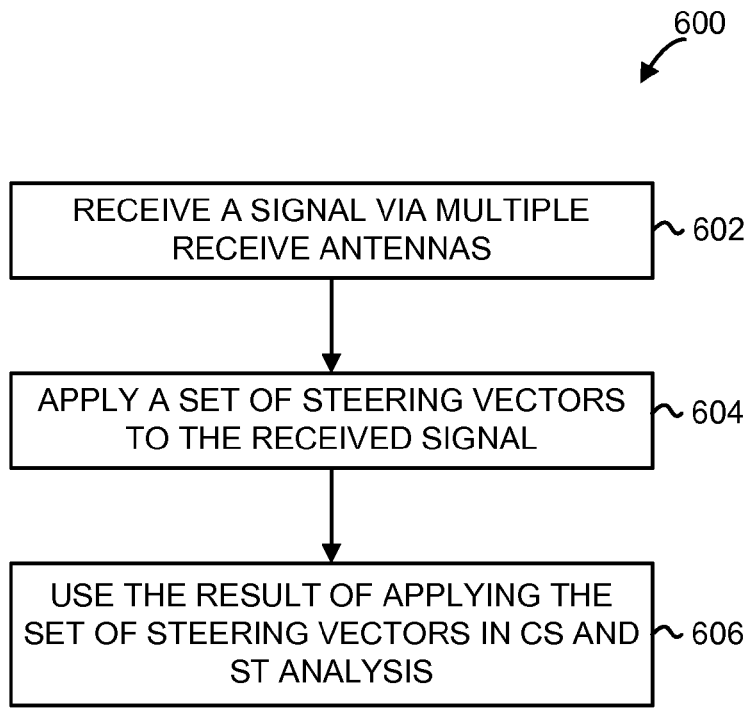
FIG. 12 is a flow diagram of an example method for opportunistic RxBF in accordance with an embodiment of the present disclosure.

FIG. 12 is a flow diagram of an example method 600 for opportunistic RxBF, according to an embodiment, at least part of which can be implemented by the opp-RxBF processor 30 or one of the opp-RxBF processors illustrated in FIGS. 4-10, for example. At block 602, a signal is received via multiple receive antennas. At block 604, a set of steering vectors is applied to the received signal. In at least some of the embodiments, the set of steering vectors is applied in parallel. Further, in at least some of the embodiments, the set of steering vectors includes more than one vector. At block 606, the results of applying the set of steering vectors are used in carrier sensing and, in at least some cases, in symbol timing synchronization.

Figure 13:
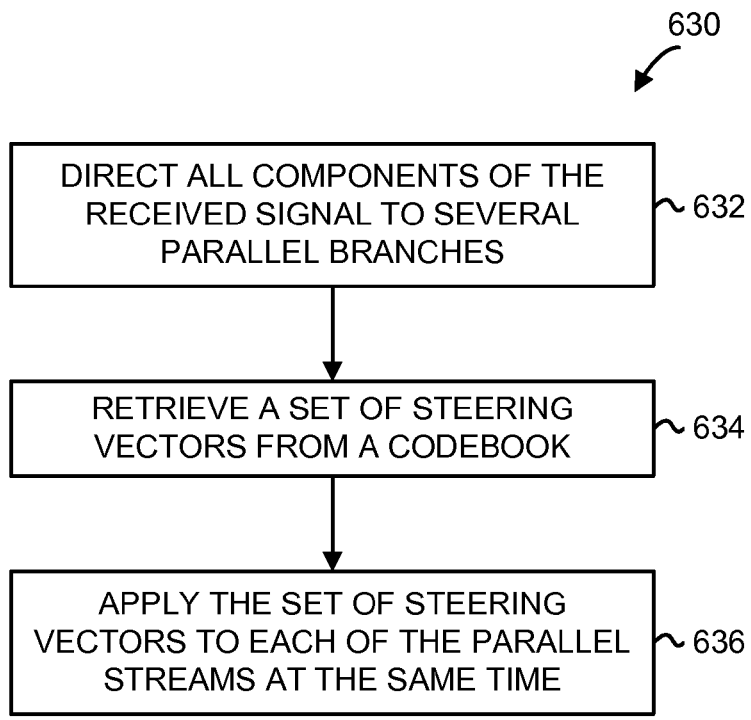
FIG. 13 is a flow diagram of an example method for applying a set of steering vectors to a signal received via multiple antennas in accordance with an embodiment of the present disclosure.

As one example, FIG. 13 is a flow diagram of an example method 630 for applying a set of steering vectors to a signal received via multiple antennas, according to an embodiment. At block 632, all signal components (e.g., components $y_1 \ldots y_N$ of a signal y corresponding to respective N receive antennas/receive chains) are directed to several parallel branches or streams. Next, at block 634, a set of steering vectors is retrieved from a codebook and subsequently applied to each of the parallel branches at substantially the same time at block 636. The method 630 also can be implemented by the opp-RxBF processor 30 or one of the opp-RxBF processors illustrated in FIGS. 4-10.

Figure 14:
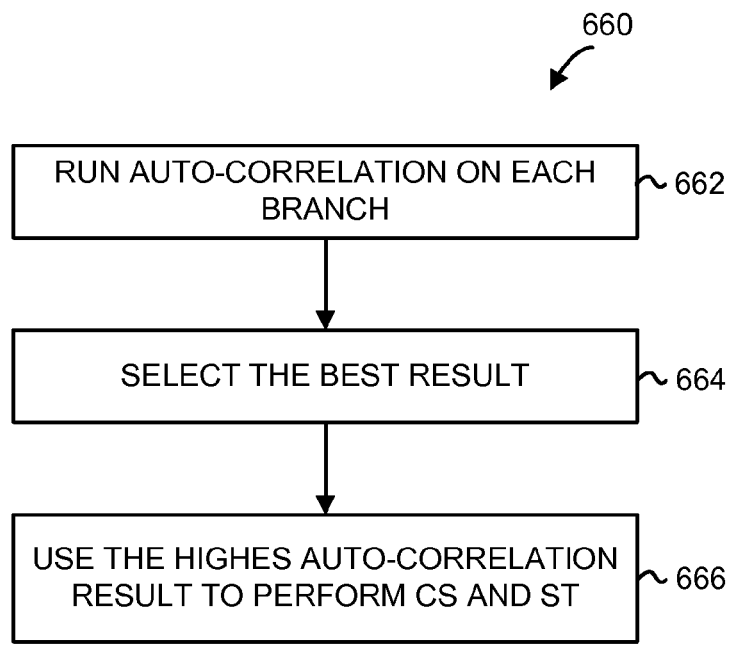
FIG. 14 is a flow diagram of an example method for processing, in the time domain, the results of applying a set of steering vectors to an OFDM signal received via multiple antennas, in accordance with an embodiment of the present disclosure.

FIG. 14 is a flow diagram of an example method 660 for processing the results of applying a set of steering vectors to an OFDM signal in the time domain, according to an embodiment. At block 662, autocorrelation on the respective output of a steering vector multiplication provided at each branch is calculated. The best result (e.g., having a highest autocorrelation metric) is selected at block 664, and the selected result is used to conduct carrier sensing and symbol timing synchronization at block 666. The method 660 also can be implemented by the opp-RxBF processor 200, for example.

Figure 15:
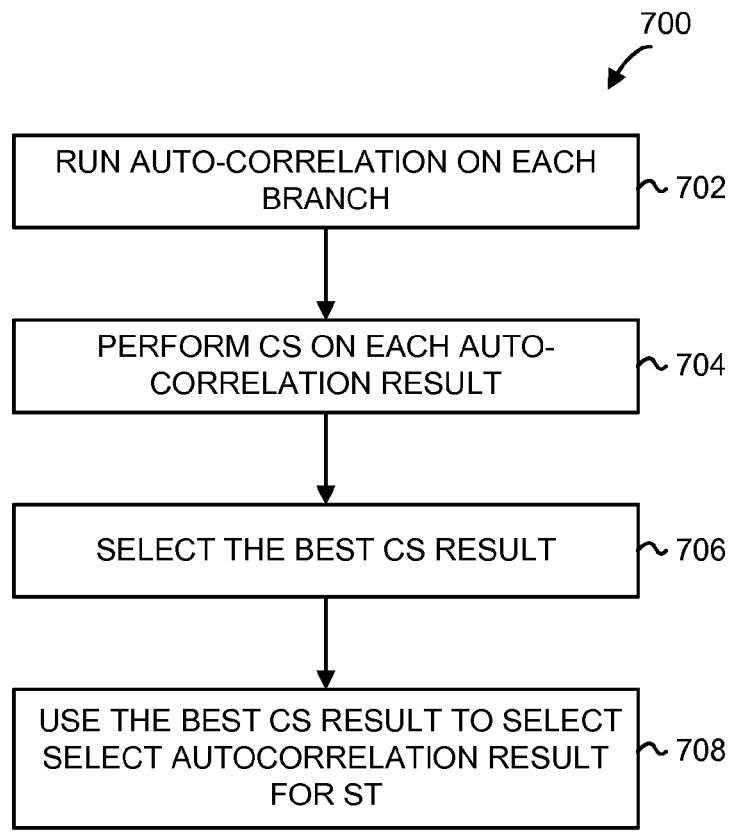
FIG. 15 is a flow diagram of another example method for processing, in the time domain, the results of applying a set of steering vectors to an OFDM signal received via multiple antennas, in accordance with an embodiment of the present disclosure.

FIG. 15 is a flow diagram of another example method 700 for processing, in the time domain, the results of applying a set of steering vectors to an OFDM signal received via multiple antennas, according to an embodiment. At block 702, autocorrelation is run on the output of respective steering vector multiplication provided at each branch. Next, at block 704, each autocorrelation result is used for carrier sensing and the best result of carrier sensing is selected at block 706. The best result of carrier sensing is also used to select a corresponding autocorrelation result for symbol timing synchronization. The method 700 also can be implemented by the opp-RxBF processor 250, for example.

Figure 16:
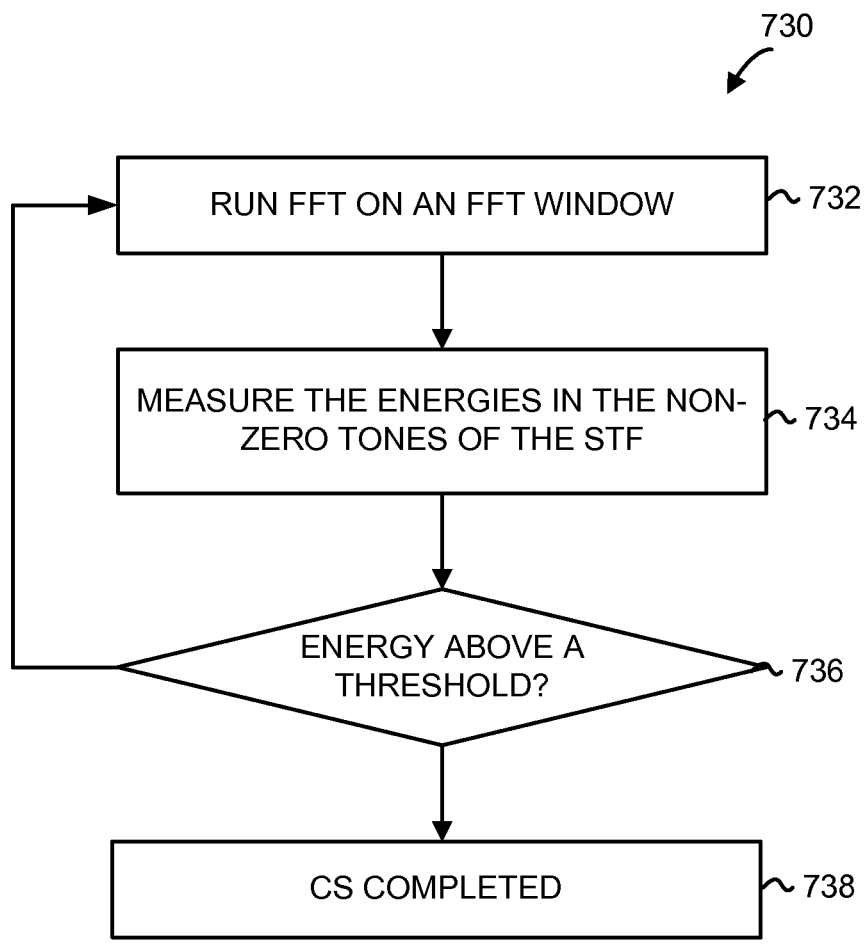
FIG. 16 is a flow diagram of an example method for sensing a carrier using a short training field (STF) associated with a frequency-domain signal, in accordance with an embodiment of the present disclosure.

FIG. 16 is a flow diagram of an example method 730 for sensing a carrier using an STF associated with a frequency-domain signal, according to an embodiment. At block 732, FFT is run on an FFT window associated with a single OFDM symbol, for example. The energies of non-zero STF tones in the STF are measured at block 734 for each tone, and the energy metrics are compared to a threshold at block 736. If the energy threshold is met, a carrier is detected (block 738); otherwise, the method 730 returns to block 732.

Figure 17:
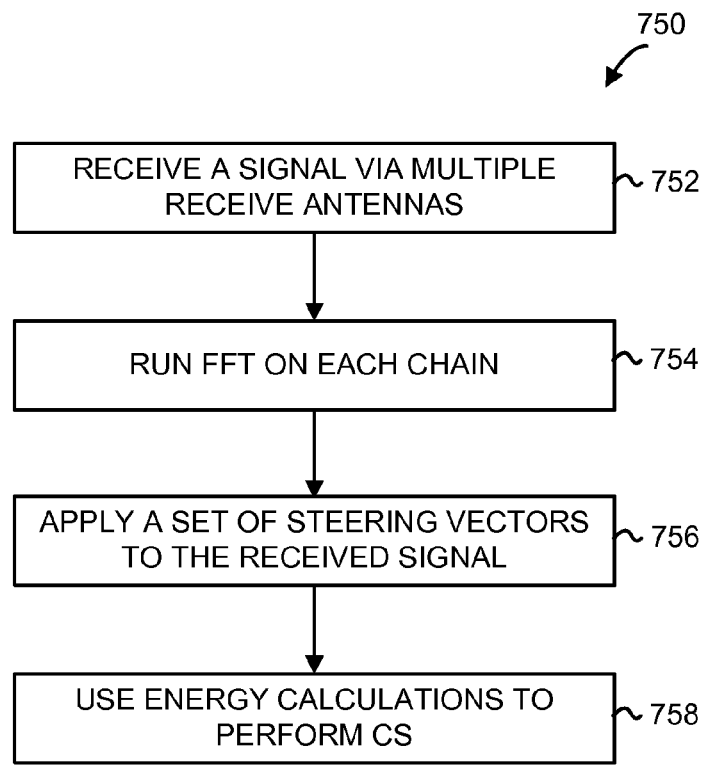
FIG. 17 is a flow diagram of an example method for processing, in the frequency domain, an OFDM signal received via multiple antennas to perform carrier sensing, in accordance with an embodiment of the present disclosure.

Next, FIG. 17 is a flow diagram of an example method 750 for processing, in the frequency domain, an OFDM signal received via multiple antennas to perform carrier sensing to obtain a higher beamforming gain as compared to the method 730, according to an embodiment. A signal is received via N receive antennas (block 752) and an FFT (or DFT) is run on each receive chain using an FFT (or DFT) window one OFDM symbol wide, for example (block 754). At block 756, a set of steering vectors is applied on the K branches onto which the frequency-domain representation of the received signal is copied (block 756). In at least some of the embodiments, the set of steering vectors is applied for every non-zero STF tone. At block 758, energy calculations on the resulting outputs are used to perform carrier sensing. The method 750 can be implemented by the opp-RxBF processor 300 or 350, for example.

Figure 18:
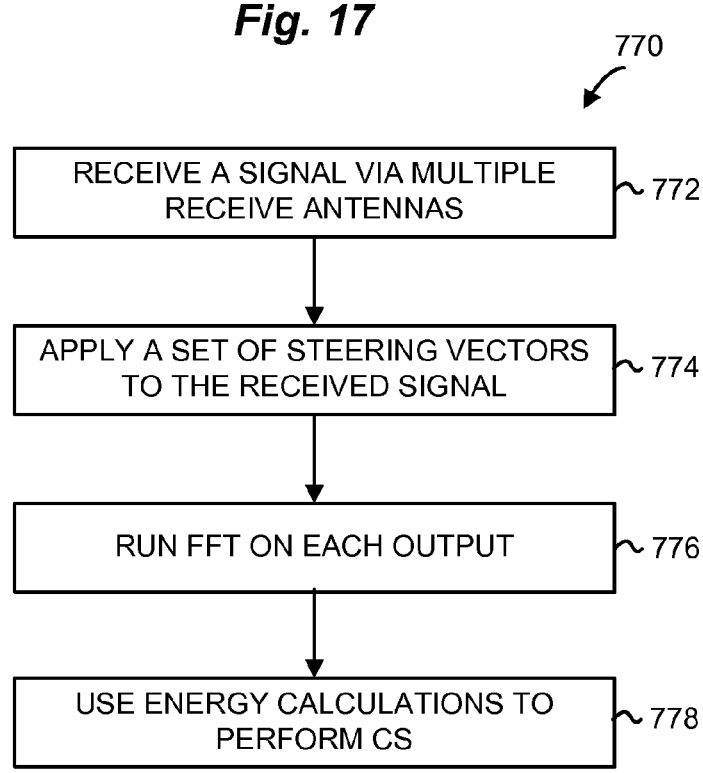
FIG. 18 is a flow diagram of another example method for processing, in the frequency domain, an OFDM signal received via multiple antennas to perform carrier sensing in accordance with an embodiment of the present disclosure.

FIG. 18 is a flow diagram of another example method 770, according to an embodiment, for processing, in the frequency domain, an OFDM signal received via multiple antennas to perform carrier sensing. A signal is received via N receive antennas (block 772) and a set of steering vectors is applied to the K branches (block 774). In at least some of the embodiments, the set of steering vectors is applied for every non-zero STF tone. Next, at block 776, an FFT (or DFT) is run on each vector multiplication output (i.e., each result of the steering vectors multiplication). At block 778, energy calculations on the resulting outputs converted to frequency domain are used to perform carrier sensing. The method 770 can be implemented by the opp-RxBF processor 400, for example.

Figure 19:
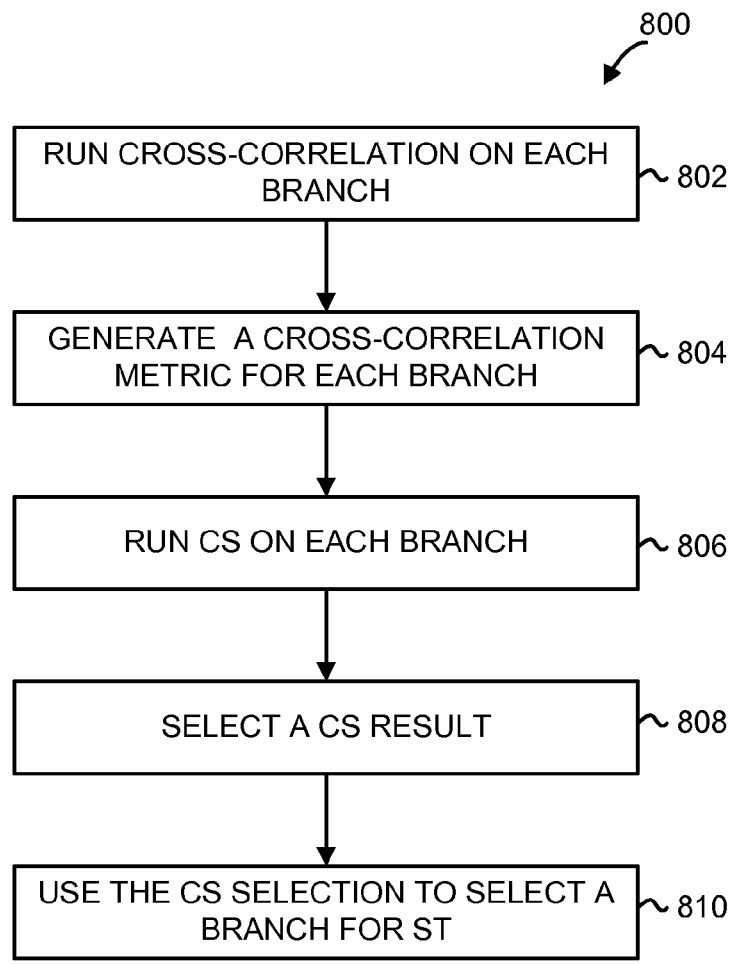
FIG. 19 is a flow diagram of an example method for processing an SC signal received via multiple antennas to perform carrier sensing and symbol timing synchronization, in accordance with an embodiment of the present disclosure.

FIG. 19 is a flow diagram of an example method 800, according to an embodiment, for processing an SC signal received via multiple antennas to perform carrier sensing and symbol timing synchronization. At block 802, cross-correlation is run on every branch of a path that carries a signal received via multiple antennas. A corresponding cross-correlation metric is generated for each branch at block 804. Next, at block 806, carrier sensing is performed on each branch, and a best carrier sensing result is selected at block 808. In some embodiments, the method 800 also includes the step of using the selection of the carrier sensing metric to select a branch for symbol timing synchronization (block 810). The method 800 can be implemented by the opp-RxBF 450, for example.

Figure 20:
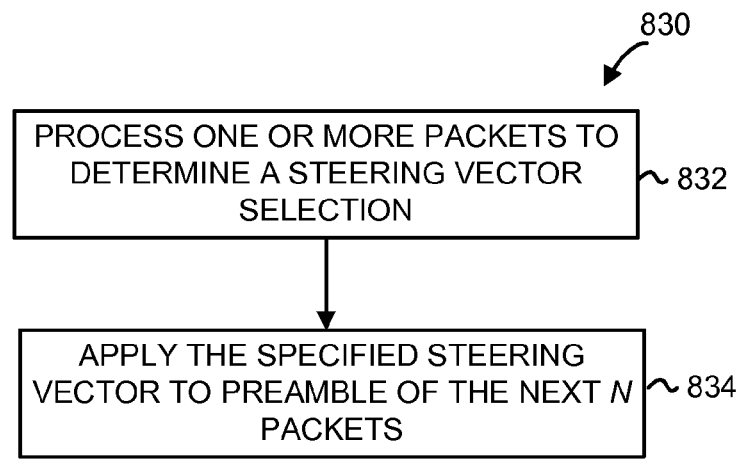
FIG. 20 is a flow diagram of an example method for using information received in the MAC layer of a data unit to efficiently apply opportunistic beamforming to the preamble of another data unit, in accordance with an embodiment of the present disclosure.

FIG. 20 is a flow diagram of an example method 830, according to an embodiment, for using information received in the MAC layer of a data unit to efficiently apply opportunistic beamforming to the preamble of another data unit. At block 832, one or several data units are processed to select a steering vector for processing the preamble of a subsequent data unit. At block 834, the selected steering vector is applied for receive RxBF of the next one or several data units. The method 800 can be implemented by the RxBF processor 552 and the MAC layer controller 554, for example.

In some embodiments, the example apparatus and methods discussed above are utilized with data units received via a communication channel at a frequency band below 8 GHz. In other embodiments, the example apparatus and methods discussed above are utilized with data units received via a communication channel at a frequency band above 8 GHz.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A non-transitory computer-readable storage medium tangibly storing instructions for processing a preamble of a signal received via a plurality of antennas, the instructions being executable by a processor to cause the processor to:
   apply a plurality of distinct steering vectors to the received signal to generate a plurality of respective outputs; and
   use the plurality of outputs to perform at least one of carrier sensing and symbol timing synchronization associated with the preamble, wherein the plurality of distinct steering vectors defines an orthogonal set.

2. The computer-readable storage medium of claim 1, wherein the plurality of distinct steering vectors are selected from rows of a Hadamard matrix or a Discrete Fourier Transform (DFT) matrix.

3. The computer-readable storage medium of claim 1, wherein the received signal is an Orthogonal Frequency Division Multiplexing (OFDM) signal, and wherein the instructions are executable by the processor to cause the processor to further:

generate a respective autocorrelation output for each of the plurality of outputs to define a plurality of autocorrelation outputs;
select one of the plurality of autocorrelation outputs; and
perform carrier sensing and symbol timing synchronization based on the selected one of the plurality of autocorrelation outputs.

4. The computer-readable storage medium of claim 1, wherein the received signal is an OFDM signal, and wherein the instructions are executable by the processor to cause the processor to further:
generate a respective autocorrelation output for each of the plurality of outputs to define a plurality of autocorrelation outputs;
generate a respective carrier sensing output for each of the plurality of autocorrelation outputs to define a plurality of carrier sensing outputs;
select one of the plurality of autocorrelation outputs based on the plurality of carrier sensing outputs; and
determine symbol timing using the selected one of the plurality of autocorrelation outputs.

5. The computer-readable storage medium of claim 1, wherein the received signal is an OFDM signal, and wherein the instructions are executable by the processor to cause the processor to further:
generate a frequency-domain representation of the received signal, wherein the frequency-domain representation of the received signal is associated with a first non-empty set of tones and a second non-empty set of tones;
wherein the instructions to apply the plurality of distinct steering vectors to the received signal include instructions executable by the processor to cause the processor to further:
apply the plurality of distinct steering vectors to the frequency-domain representation of the received signal for each tone in the first set of tones so that each of the plurality of outputs corresponds to a respective set of tone outputs; and
generate an energy metric associated with the plurality of outputs;
wherein using the plurality of outputs includes performing carrier sensing using the energy metric.

6. The computer-readable storage medium of claim 5, wherein the instructions to generate the energy metric associated with the plurality of outputs include instructions executable by the processor to cause the processor to further:
select, from the plurality of outputs, an output associated with a maximum magnitude for each tone in the first set of tones to generate a set of selected tone outputs; and
calculate the energy metric of the set of selected tone outputs in view of the second non-empty set of tones.

7. The computer-readable storage medium of claim 5, wherein the instructions to generate the energy metric associated with the plurality of outputs include instructions executable by the processor to cause the processor to further:
determine, for each of the plurality of outputs, a respective energy level for each tone in the first set of tones to define a plurality of sets of energy levels;
calculate a sum of energy levels for each of the plurality of sets of energy levels to define a plurality of energy level sums; and
associate the energy metric with a largest one of the plurality of energy level sums.

8. The computer-readable storage medium of claim 5, wherein the signal includes a plurality of signal components each associated with a respective one of the plurality of antennas;
wherein the instructions to generate the frequency-domain representation of the received signal includes instructions executable by the processor to cause the processor to further calculate a Fast Fourier Transform (FFT) on each of the plurality of signal components.

9. The computer-readable storage medium of claim 1, wherein the received signal is an OFDM signal, and wherein the instructions are executable by the processor to cause the processor to further:
generate a frequency-domain representation of each of the plurality of outputs to define a plurality of frequency-domain outputs, wherein the plurality of frequency-domain outputs is associated with a first non-empty set of tones and a second non-empty set of tones;
select, from the plurality of frequency-domain outputs, a frequency-domain output associated with a maximum magnitude for each tone in the first set of tones to generate a set of selected tone outputs;
generate an energy metric based on the set of selected tone outputs; and
perform carrier sensing using the energy metric.

10. The computer-readable storage medium of claim 1, wherein the received signal is a single-carrier (SC) signal, and wherein the instructions are executable by the processor to cause the processor to further:
generate a respective cross-correlation output for each of the plurality of outputs to define a plurality of cross-correlation outputs;
generate a respective metric for each of the plurality of cross-correlation outputs to define a plurality of metrics; and
select one of the plurality of metrics to perform carrier sensing.

11. The computer-readable storage medium of claim 10, wherein the instructions are executable by the processor to cause the processor to further select one of the plurality of cross-correlation outputs in accordance with the selected one of the plurality of metrics to perform symbol timing synchronization.

12. The computer-readable storage medium of claim 1, wherein the received signal is a single-carrier (SC) signal, and wherein the instructions are executable by the processor to cause the processor to further:
generate a respective cross-correlation output for each of the plurality of outputs to define a plurality of cross-correlation outputs;
generate a respective carrier sensing metric for each of the plurality of cross-correlation outputs to define a plurality of carrier sensing metrics;
select one of the plurality of carrier sensing metrics to define a carrier sensing output; and
select one of the plurality of cross-correlation outputs in accordance with the selected one of the plurality of carrier sensing metrics to perform symbol timing synchronization.

13. A receiver apparatus for use in a wireless communication system, the receiver apparatus comprising:
a receive processor to receive a signal via a plurality of antennas, wherein the receive processor is configured to perform at least one of carrier sensing and symbol timing synchronization on the received signal by applying a plurality of orthogonal steering vectors to the receiver signal to generate a plurality of respective outputs.

14. The receiver apparatus of claim 13, further comprising a signal path to receive the received signal, the signal path being coupled to the plurality of antennas.

15. The receiver apparatus of claim 13, wherein the receive processor is configured to apply the plurality of orthogonal steering vectors to the received signal in parallel.

16. The receiver apparatus of claim 13, wherein the received signal is an Orthogonal Frequency Division Multiplexing (OFDM) signal.

17. The receiver apparatus of claim 16, wherein the receiver apparatus further comprises:
a plurality of autocorrelation calculators each configured to generate a respective autocorrelation output for each of the plurality of outputs to define a plurality of autocorrelation outputs;
a selection unit configured to select one of the plurality of autocorrelation outputs; and
at least one of (i) a carrier sensing module configured to perform carrier sensing based on the selected one of the plurality of autocorrelation outputs or (ii) a symbol timing synchronization unit configured to perform symbol timing synchronization based on the selected one of the plurality of autocorrelation outputs.

18. The receiver apparatus of claim 16, wherein the receiver apparatus comprises:
a plurality of autocorrelation calculators each configured to generate a respective autocorrelation output for each of the plurality of outputs to define a plurality of autocorrelation outputs;
a carrier sensing module configured to generate a respective carrier sensing output for each of the plurality of autocorrelation outputs to define a plurality of carrier sensing outputs;
a selection unit configured to select one of the plurality of autocorrelation outputs based on the plurality of carrier sensing outputs; and
a symbol timing synchronization unit configured to determine symbol timing using the selected one of the plurality of autocorrelation outputs.

19. The receiver apparatus of claim 16, wherein the receiver apparatus comprises:
a frequency-domain conversion unit configured to generate a frequency-domain representation of the received signal, wherein the frequency-domain representation of the received signal is associated with a first non-empty set of tones and a second non-empty set of tones;
a plurality of Fast Fourier Transformation (FFT) units configured to apply the plurality of distinct steering vectors to the frequency-domain representation of the received signal for each tone in the first set of tones so that each of the plurality of outputs corresponds to a respective set of tone outputs; and
an energy computation unit configured to generate an energy metric associated with the plurality of outputs;
wherein using the plurality of outputs includes performing carrier sensing using the energy metric.

20. The receiver apparatus of claim 19, wherein the receiver apparatus comprises:
a selection unit to configured to select, from the plurality of outputs, an output associated with a maximum magnitude for each tone in the first set of tones to generate a set of selected tone outputs; and
an energy computation unit configured to calculate the energy metric of the set of selected tone outputs in view of the second non-empty set of tones.

21. The receiver apparatus of claim 19, wherein the receive processor is configured to:
determine, for each of the plurality of outputs, a respective energy level for each tone in the first set of tones to define a plurality of sets of energy levels;
calculate a sum of energy levels for each of the plurality of sets of energy levels to define a plurality of energy level sums; and
associate the energy metric with a largest one of the plurality of energy level sums.

22. The receiver apparatus of claim 19, wherein the received signal includes a plurality of signal components each associated with a respective one of the plurality of antennas, the receive processor is configured to generate the frequency-domain representation of the received signal by calculating a Fast Fourier Transform (FFT) on each of the plurality of signal components.

23. The receiver apparatus of claim 16, wherein the receive processor is configured to:
a frequency-domain conversion unit configured to generate a frequency-domain representation of each of the plurality of outputs to define a plurality of frequency-domain outputs, wherein the plurality of frequency-domain outputs is associated with a first non-empty set of tones and a second non-empty set of tones;
a selection unit configured to select, from the plurality of frequency-domain outputs, a frequency-domain output associated with a maximum magnitude for each tone in the first set of tones to generate a set of selected tone outputs;
an energy computation unit configured generate an energy metric based on the set of selected tone outputs; and
a carrier sensing module configured to perform carrier sensing using the energy metric.

24. The receiver apparatus of claim 13, wherein the received signal is a single-carrier (SC) signal; and wherein the receive processor is configured to:
generate a respective cross-correlation output for each of the plurality of outputs to define a plurality of cross-correlation outputs;
generate a respective metric for each of the plurality of cross-correlation outputs to define a plurality of metrics; and
select one of the plurality of metrics to perform carrier sensing.

25. The receiver apparatus of claim 24, wherein the receive processor is configured to select one of the plurality of cross-correlation outputs in accordance with the selected one of the plurality of metrics to perform symbol timing synchronization.

26. The receiver apparatus of claim 13, wherein the received signal is a single-carrier (SC) signal; and wherein the receive processor is configured to:
generate a respective cross-correlation output for each of the plurality of outputs to define a plurality of cross-correlation outputs;
generate a respective carrier sensing metric for each of the plurality of cross-correlation outputs to define a plurality of carrier sensing metrics;
select one of the plurality of carrier sensing metrics to define a carrier sensing output; and
select one of the plurality of cross-correlation outputs in accordance with the selected one of the plurality of carrier sensing metrics to perform symbol timing synchronization.

\* \* \* \* \*